United States Patent
Lee et al.

(10) Patent No.: US 11,755,141 B2
(45) Date of Patent: Sep. 12, 2023

(54) DISPLAY DEVICE AND METHOD OF DRIVING WITH DIFFERENT SENSOR DRIVING FREQUENCIES ACCORDING TO PROXIMITY, TOUCH AND IMAGE TYPE

(71) Applicant: Samsung Display Co., Ltd., Yongin-si (KR)

(72) Inventors: Soongyu Lee, Seoul (KR); Hoeung Lee, Suwon-si (KR); Yongjin Jee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/585,221

(22) Filed: Jan. 26, 2022

(65) Prior Publication Data

US 2022/0244829 A1     Aug. 4, 2022

(30) Foreign Application Priority Data

Feb. 2, 2021    (KR) ........................ 10-2021-0015016

(51) Int. Cl.
*G06F 3/041*     (2006.01)
*G06F 3/044*     (2006.01)

(52) U.S. Cl.
CPC ........ *G06F 3/04164* (2019.05); *G06F 3/0412* (2013.01); *G06F 3/0446* (2019.05); *G06F 2203/04106* (2013.01)

(58) Field of Classification Search
CPC ............... G06F 3/04164; G06F 3/0412; G06F 3/04166; G06F 3/04108
See application file for complete search history.

(56) References Cited

U.S. PATENT DOCUMENTS

| | | | |
|---|---|---|---|
| 9,268,433 B2* | 2/2016 | Al-Dahle | G06F 3/04166 |
| 9,357,045 B2 | 5/2016 | Oishi et al. | |
| 2012/0127124 A1* | 5/2012 | Zanone | G06F 3/0446 |
| | | | 345/174 |
| 2015/0234446 A1* | 8/2015 | Nathan | G06F 3/0445 |
| | | | 345/174 |
| 2016/0188142 A1* | 6/2016 | Oh | G06F 1/3265 |
| | | | 345/87 |
| 2018/0164946 A1* | 6/2018 | Noguchi | G06F 3/0445 |
| 2018/0204532 A1* | 7/2018 | Kobayashi | G02B 27/017 |
| 2021/0149540 A1* | 5/2021 | Shikata | G09G 3/20 |
| 2021/0191555 A1* | 6/2021 | Jo | G09G 3/3685 |

FOREIGN PATENT DOCUMENTS

| | | |
|---|---|---|
| KR | 10-2013-0078937 A | 7/2013 |
| KR | 10-1362843 B1 | 2/2014 |

* cited by examiner

*Primary Examiner* — Liliana Cerullo
(74) *Attorney, Agent, or Firm* — Lewis Roca Rothgerber Christie LLP

(57) ABSTRACT

A display device includes: a display panel configured to display an image; an input sensor on the display panel and configured to operate in a first sensing mode or a second sensing mode different from the first sensing mode; and a sensor controller configured to drive the input sensor, wherein the sensor controller is configured to drive the input sensor under a first driving condition different from a driving condition of the first sensing mode in response to the second sensing mode being entered, and the sensor controller is configured to change the first driving condition to a second driving condition different from the first driving condition according to a specific event which occurs after entering the second sensing mode.

15 Claims, 15 Drawing Sheets

FIG. 3A
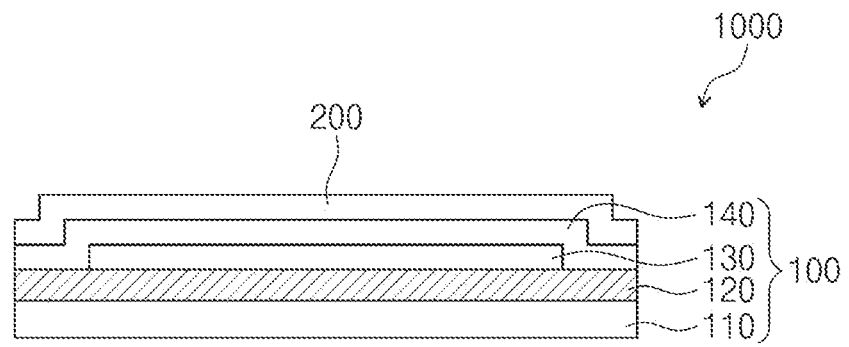
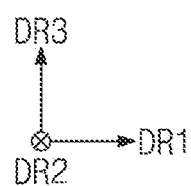
FIG. 3B
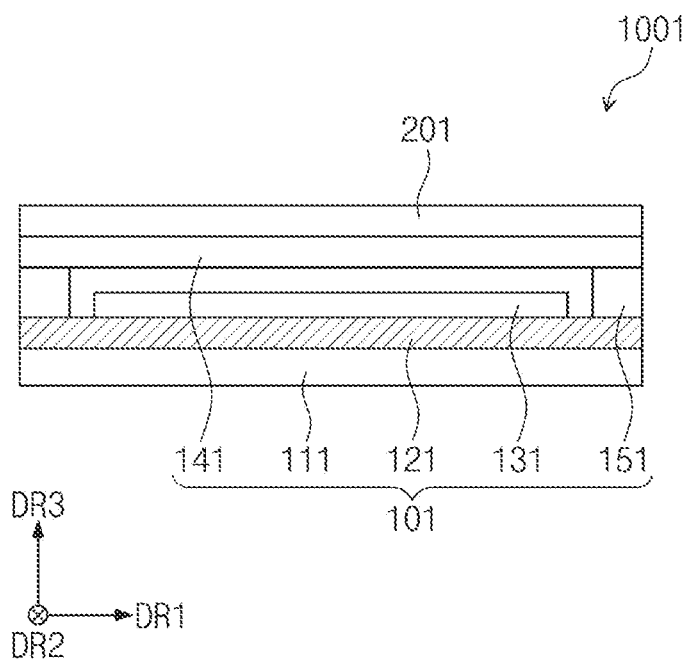
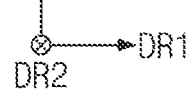

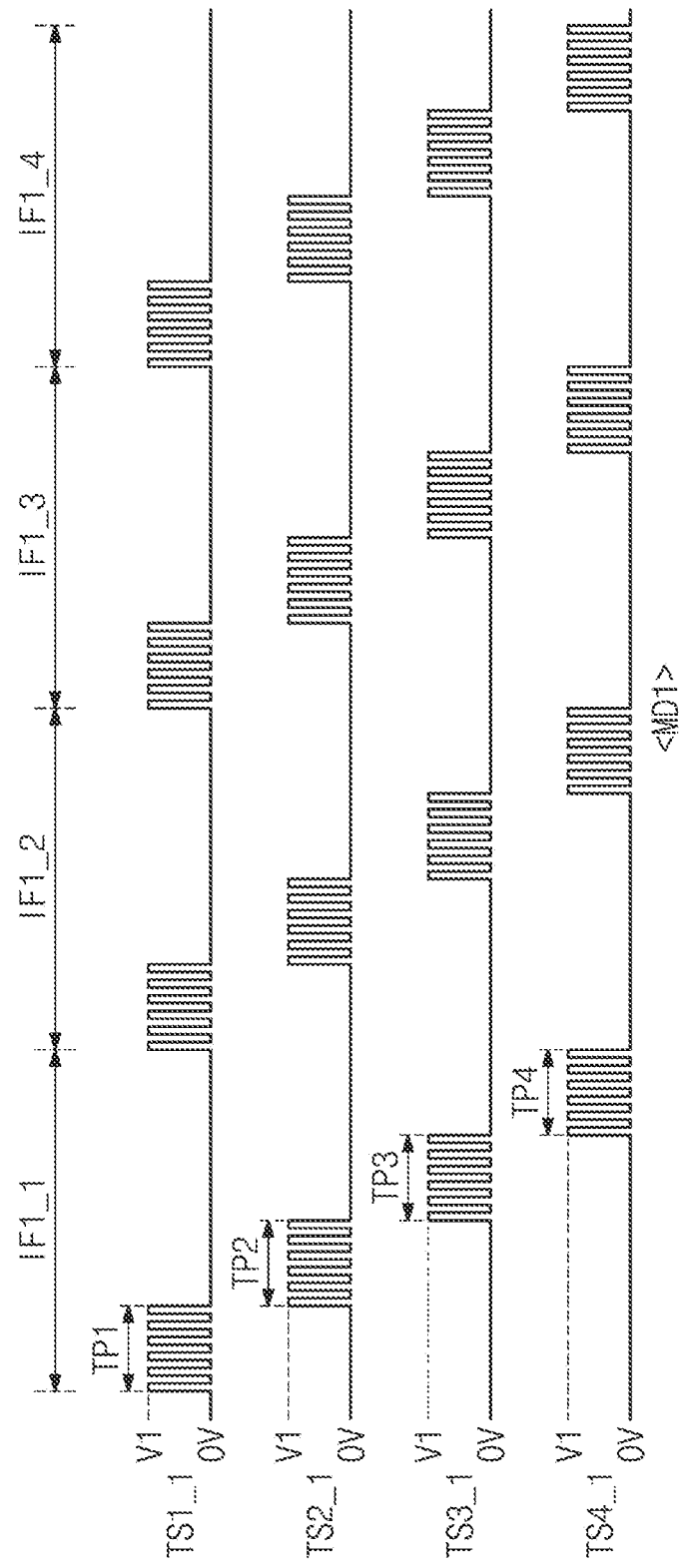

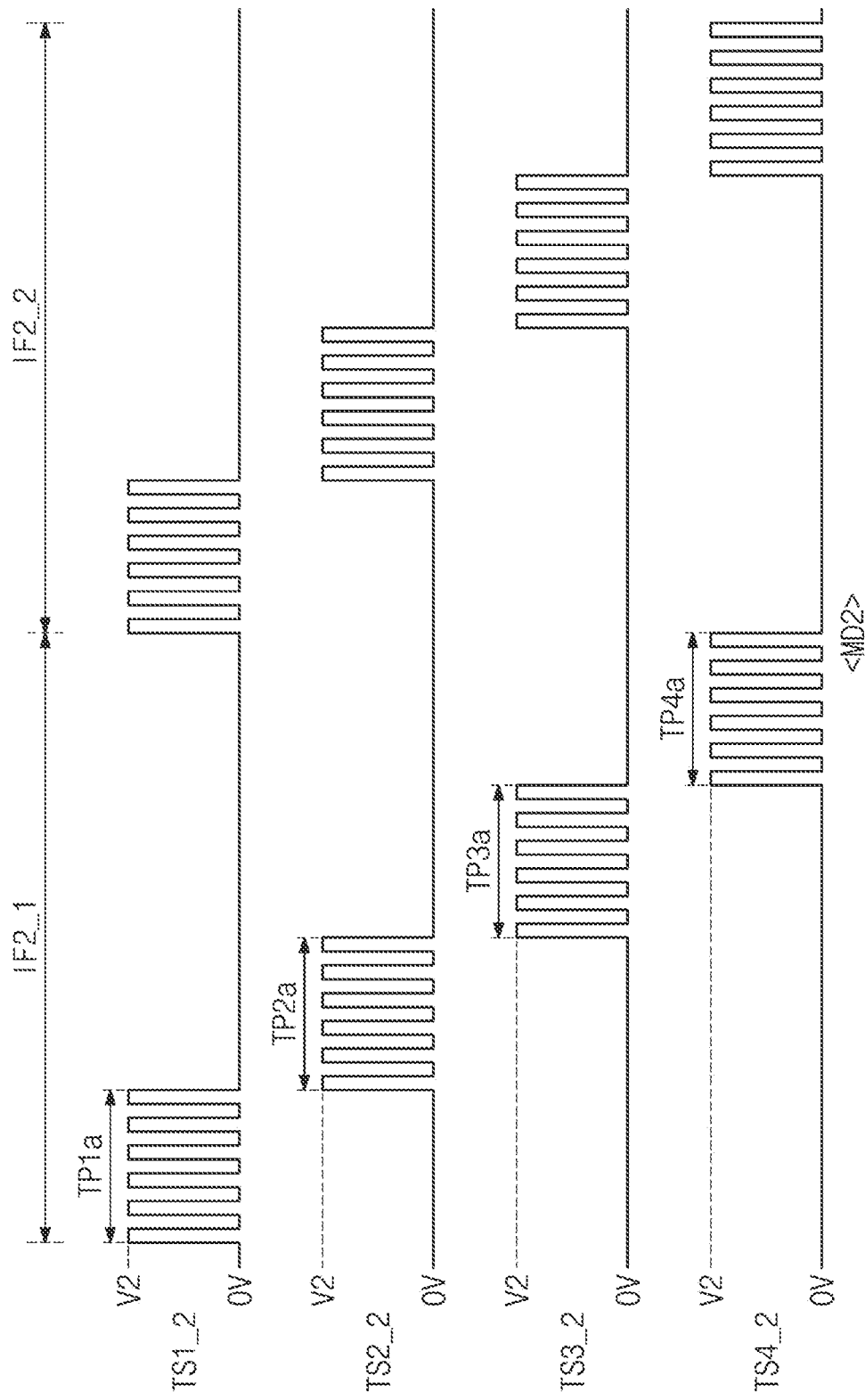

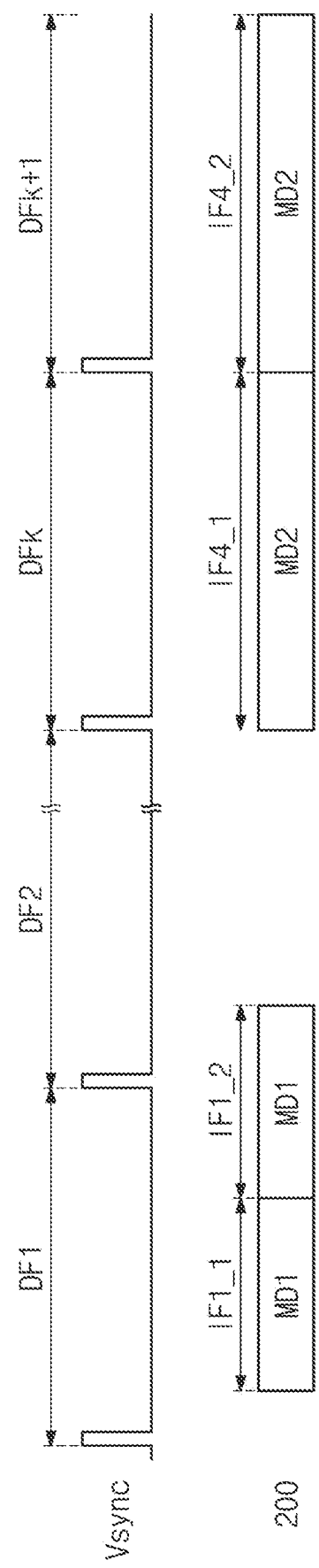

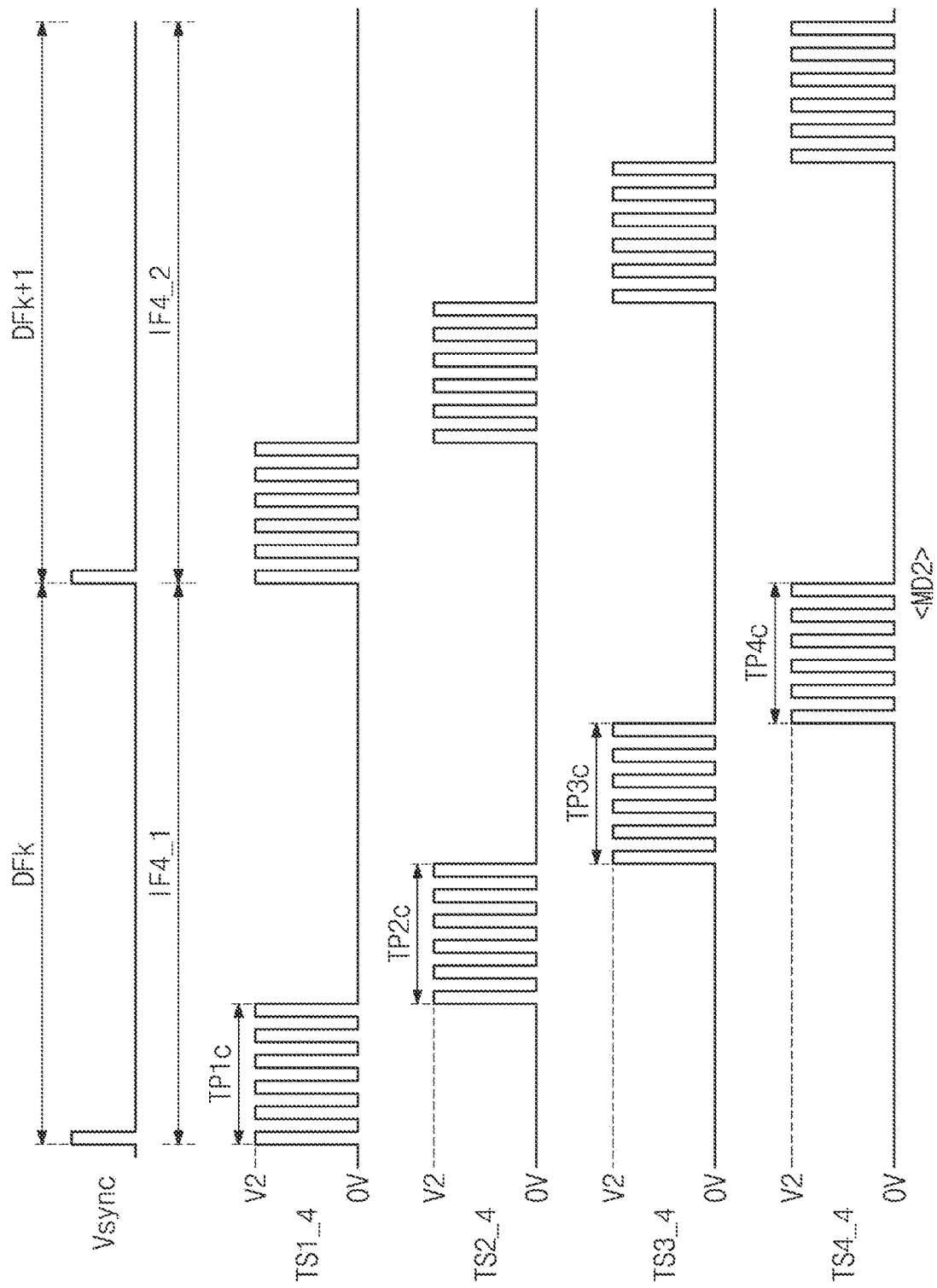

DISPLAY DEVICE AND METHOD OF DRIVING WITH DIFFERENT SENSOR DRIVING FREQUENCIES ACCORDING TO PROXIMITY, TOUCH AND IMAGE TYPE

CROSS-REFERENCE TO RELATED APPLICATION

The present application claims priority to and the benefit of Korean Patent Application No. 10-2021-0015016, filed on Feb. 2, 2021, the entire content of which is hereby incorporated by reference.

BACKGROUND

Aspects of some embodiments of the present disclosure herein relate to a display device having a proximity sensing function and a method of driving the same.

Multimedia electronic devices such as televisions, mobile phones, tablet computers, navigation devices, and game machines may have a display device for displaying images. Display devices may each include an input sensor capable of providing a touch-based input method that enables users to relatively easily input information or commands in an intuitive and convenient manner, in addition to other input methods using, for example, a button, a keyboard, or a mouse.

The above information disclosed in this Background section is only for enhancement of understanding of the background and therefore the information discussed in this Background section does not necessarily constitute prior art.

SUMMARY

Aspects of some embodiments of the present disclosure include a display device having a proximity sensing function and a method of driving the same.

Aspects of some embodiments of the inventive concept include a display device including a display panel configured to display images, an input sensor on the display panel and configured to operate in a first sensing mode or a second sensing mode different from the first sensing mode, and a sensor controller configured to drive the input sensor.

According to some embodiments, the sensor controller may drive the input sensor under a first driving condition different from a driving condition of the first sensing mode when the second sensing mode is entered, and the sensor controller may change the first driving condition to a second driving condition different from the first driving condition according to a specific event which occurs after entering the second sensing mode.

According to some embodiments, a method of driving a display device includes displaying an image through a display panel, and driving an input sensor on the display panel in a first sensing mode or a second sensing mode different from the first sensing mode.

According to some embodiments, the driving of the input sensor may include driving the input sensor under a first driving condition different from a driving condition of the first sensing mode when the second sensing mode is entered, and changing the first driving condition to a second driving condition according to a specific event which occurs after entering the second sensing mode is entered.

BRIEF DESCRIPTION OF THE FIGURES

The accompanying drawings are included to provide a further understanding of embodiments according to the inventive concept, and are incorporated in and constitute a part of this specification. The drawings illustrate aspects of some embodiments of the inventive concept and, together with the description, serve to describe principles of embodiments according to the inventive concept. In the drawings:

FIG. 3A is a cross-sectional view of a display device according some embodiments;

FIG. 3B is a cross-sectional view of a display device according some embodiments;

FIG. 8A is a waveform diagram illustrating first sensing transmission signals transmitted to an input sensor in a touch sensing mode according some embodiments;

FIG. 8B is a waveform diagram illustrating second sensing transmission signals transmitted to an input sensor in a proximity sensing mode according some embodiments;

FIG. 10B is a conceptual diagram illustrating synchronization driving condition of a proximity sensing mode according some embodiments;

FIG. 10C is a waveform diagram illustrating fourth sensing transmission signals transmitted to an input sensor under a synchronization driving condition of a proximity sensing mode according some embodiments;

DETAILED DESCRIPTION

Figure 1:
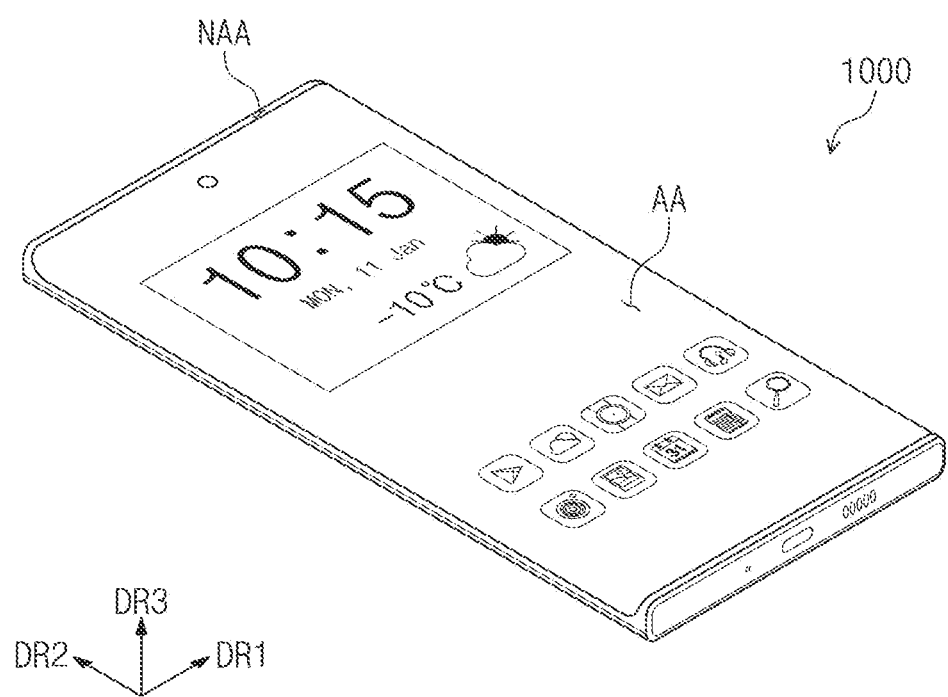
FIG. 1 is a perspective view of a display device according some embodiments.

It will be understood that when an element or layer is referred to as being "on", "connected to", or "coupled to" another element or layer, it can be directly on, connected to, or coupled to the other element or layer, or intervening elements or layers may be present.

Like reference numerals refer to like elements throughout this specification. In the figures, the thicknesses, ratios, and dimensions of elements are exaggerated for effective description of the technical contents.

As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention. As used herein, the singular forms, "a", "an", and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their dictionary meaning in the context of the relevant art and will not be interpreted in an idealized or overly formal sense unless expressly so defined herein.

It will be further understood that the terms "include" or "have", when used in this specification, specify the presence of stated features, integers, steps, operations, components, parts, and/or groups thereof, but do not preclude the presence or addition of one or more other features, integers, steps, operations, components, parts, and/or groups thereof.

As used herein, the term "part" or "unit" refers to a software component or a hardware component that performs a specific function. A hardware component may include, for example, a field-programmable gate array (FPGA) or an application-specific integrated circuit (ASIC). A software component may refer to executable code and/or data used by the executable code in an addressable storage medium. Thus, software components may be, for example, object-oriented software components, class components, and task components, and may include processes, functions, attributes, procedures, subroutines, program code segments, drivers, firmware, microcode, circuits, data, databases, data structures, tables, arrays, or variables.

Hereinafter, aspects of some embodiments of the present invention will be explained in more detail with reference to the accompanying drawings.

FIG. 1 is a perspective view of a display device according some embodiments of the inventive concept.

Referring to FIG. 1, a display device 1000 may be a device that is activated according to an electrical signal. For example, the display device 1000 may be a mobile phone, a foldable phone, a laptop computer, a television, a tablet, a car navigation device, a game machine, or a wearable device, but embodiments are not limited thereto. FIG. 1 illustrates an example of the display device 1000 as a mobile phone.

An active area AA and a peripheral area NAA may be defined in the display device 1000. The display device 1000 may display images through the active area AA. The active area AA may include a surface defined by a first direction DR1 and a second direction DR2. The peripheral area NAA may surround the active area AA.

A thickness direction of the display device 1000 may be parallel to a third direction DR3 crossing the first direction DR1 and the second direction DR2. Accordingly, a front surface (or a top surface) and a rear surface (or a bottom surface) of each of members constituting the display device 1000 may be defined on the basis of the third direction DR3.

Figure 2:
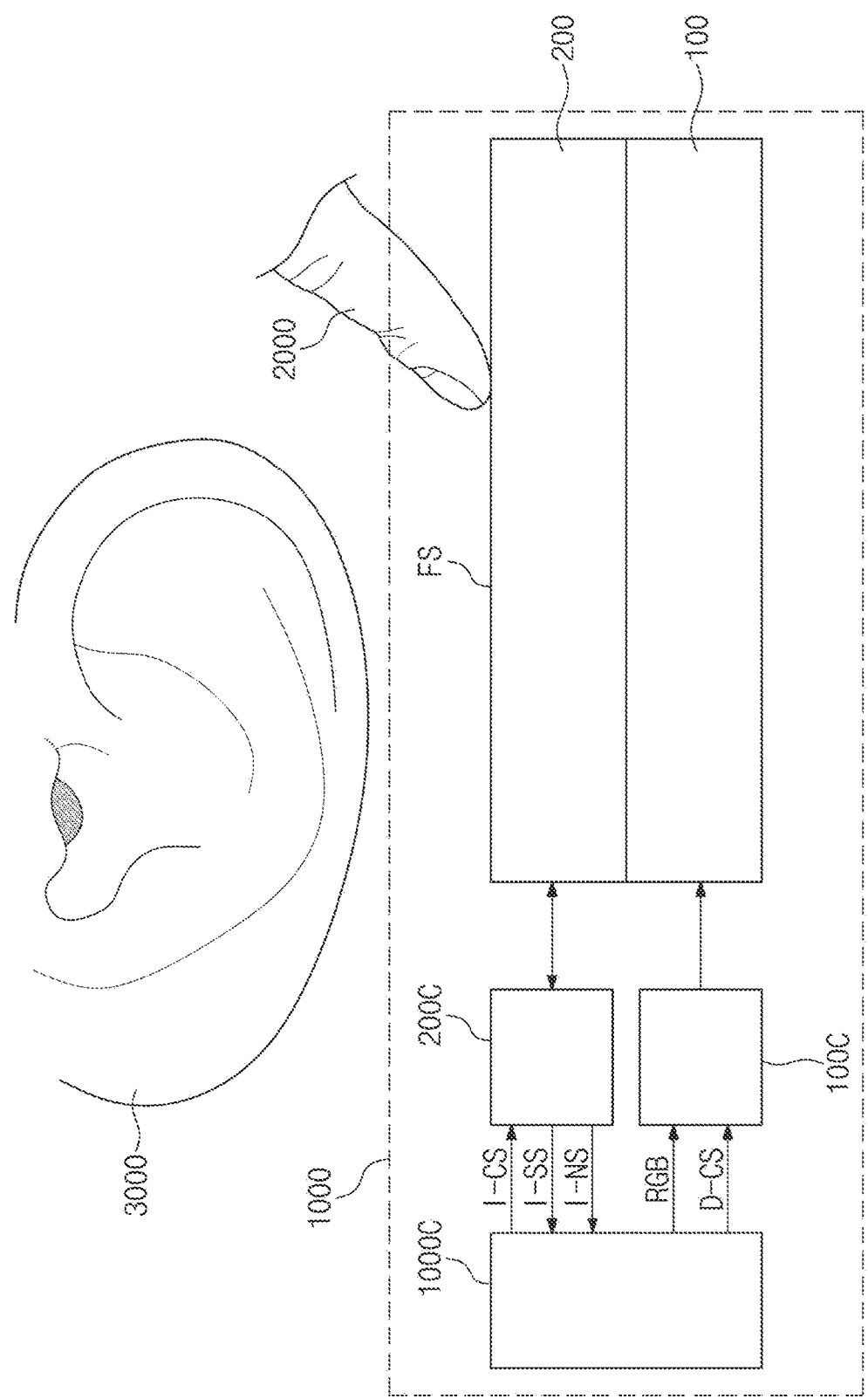
FIG. 2 is a view for describing an operation of a display device according some embodiments.

FIG. 2 is a view for describing an operation of a display device according some embodiments of the inventive concept.

Referring to FIG. 2, the display device 1000 may include a display panel 100, an input sensor 200, a panel driver 100C, a sensor controller 200C, and a main controller 1000C.

The display panel 100 may be a component that generates or displays images. The display panel 100 may be a light emitting display panel and may be, for example, an organic light emitting display panel, an inorganic light emitting display panel, a quantum dot display panel, a micro LED display panel, or a nano LED display panel.

The input sensor 200 may be arranged on the display panel 100. The input sensor 200 may sense an external input 2000 applied from the outside (e.g., from a touch input). The external input 2000 may include all inputs through input means capable of providing a change in capacitance. For example, the input sensor 200 may sense not only an input by a passive-type input means such as a user's body (e.g., a finger), but also an input by an active-type input means that transmits and receives signals.

The main controller 1000C may control an overall operation of the display device 1000. For example, the main controller 1000C may control operations of the panel driver 100C and the sensor controller 200C. The main controller 1000C may include at least one microprocessor and may be referred to as a host. The main controller 1000C may further include a graphic controller.

The panel driver 100C may drive the display panel 100. The panel driver 100C may receive image data RGB and a display control signal D-CS from the main controller 1000C. The display control signal D-CS may include various signals. For example, the display control signal D-CS may include a vertical synchronization signal, a horizontal synchronization signal, a main clock, a data enable signal, and the like. The panel driver 100C may generate a scan control signal and a data control signal based on the display control signal D-CS to control driving of the display panel 100.

The sensor controller 200C may control driving of the input sensor 200. The sensor controller 200C may receive a sensing control signal I-CS from the main controller 1000C. The sensing control signal I-CS may include a mode determination signal for determining a driving mode of the sensor controller 200C and a clock signal. The main controller 1000C may provide the sensor controller 200C with some signals of the display control signal D-CS, e.g., the vertical synchronization signal, in addition to the sensing control signal I-CS.

The sensor controller 200C may calculate coordinate information of a user's input on the basis of a signal received from the input sensor 200 and may provide the main controller 1000C with a coordinate signal I-SS having the coordinate information. The main controller 1000C allows an operation corresponding to the user's input to be executed on the basis of the coordinate signal I-SS. For example, the main controller 1000C may operate the panel driver 100C so that a new application image is displayed on the display panel 100.

The sensor controller 200C may detect the approach of an object 3000 close to a surface FS of the display device 1000 on the basis of a signal received from the input sensor 200. In FIG. 2, a user's ear approaching the display device 1000 is illustrated as an example of the object 3000. However, the object 3000 may also be a user's face or another object according to the design of the sensor controller 200C. The sensor controller 200C may provide the main controller 1000C with a proximity sensing signal I-NS including sensing information of an object in close proximity. The main controller 1000C may operate the panel driver 100C on the basis of the proximity sensing signal I-NS so that luminance of an image displayed on the display panel 100 is decreased, or no image is displayed on the display panel 100. For example, the main controller 1000C may turn off the screen of the display device 1000 on the basis of the proximity sensing signal I-NS.

FIG. 3A is a cross-sectional view of a display device according some embodiments of the inventive concept.

Referring to FIG. 3A, the display device 1000 may include the display panel 100 and the input sensor 200. The display panel 100 may include a base layer 110, a circuit layer 120, a light emitting element layer 130, and an encapsulation layer 140.

The base layer 110 may be a member providing a base surface on which the circuit layer 120 is arranged. The base layer 110 may be a glass substrate, a metal substrate, or a polymer substrate. However, embodiments according to the present disclosure are not limited thereto, and the base layer 110 may be an inorganic layer, an organic layer, or a composite material layer.

The base layer 110 may have a multilayer structure. For example, the base layer 110 may include a first synthetic resin layer, a silicon oxide (SiOx) layer arranged on the first synthetic resin layer, an amorphous silicon (a-Si) layer arranged on the silicon oxide layer, and a second synthetic resin layer arranged on the amorphous silicon layer. The silicon oxide layer and the amorphous silicon layer may be referred to as a base barrier layer.

Each of the first and second synthetic resin layers may include polyimide-based resin. In addition, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin.

The circuit layer 120 may be arranged on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a method such as coating and deposition, and thereafter, the insulating layer, the semiconductor layer, and the conductive layer may be selectively patterned through multiple times of photolithography process. Thereafter, the semiconductor pattern, the conductive pattern, and the signal line included in the circuit layer 120 may be formed.

The light emitting element layer 130 may be arranged on the circuit layer 120. The light emitting element layer 130 may include a light emitting element. For example, the light emitting element layer 130 may include an organic light emitting material, an inorganic light emitting material, a quantum dot, a quantum rod, a micro LED, or a nano LED.

The encapsulation layer 140 may be arranged on the light emitting element layer 130. The encapsulation layer 140 may protect the light emitting element layer 130 from foreign matter such as moisture, oxygen, and dust particles.

The input sensor 200 may be arranged on the display panel 100. The input sensor 200 may sense the external input 2000 (see FIG. 2) applied from the outside. The external input 2000 may be a user's input. The user's input may include various types of external inputs such as a part of a user's body, light, heat, a pen, and pressure.

The input sensor 200 may be formed on the display panel 100 through a continuous process. In this case, the input sensor 200 may be said to be directly arranged on the display panel 100. The expression "directly arranged" may mean that a third component is not arranged between the input sensor 200 and the display panel 100. That is, a separate adhesive member may not be arranged between the input sensor 200 and the display panel 100. Optionally, the input sensor 200 may be bonded to the display panel 100 by an adhesive member. The adhesive member may include a suitable adhesive or a typical detachable adhesive.

According to some embodiments, an anti-reflection layer and an optical layer arranged on the input sensor 200 may be further included in the display device 1000. The anti-reflection layer may reduce the degree of reflection of external light incident from outside of the display device 1000. The optical layer may control the direction of light incident from the display panel 100 to improve front luminance of the display device 1000.

FIG. 3B is a cross-sectional view of a display device according some embodiments of the inventive concept.

Referring to FIG. 3B, a display device 1001 may include a display panel 101 and an input sensor 201. The display panel 101 may include a base substrate 111, a circuit layer 121, a light emitting element layer 131, an encapsulation substrate 141, and a bonding member 151.

Each of the base substrate 111 and the encapsulation substrate 141 may be a glass substrate, a metal substrate, or a polymer substrate, but embodiments according to the present disclosure are not particularly limited thereto.

The bonding member 151 may be arranged between the base substrate 111 and the encapsulation substrate 141. The bonding member 151 may bond the encapsulation substrate 141 to the base substrate 111 or the circuit layer 121. The bonding member 151 may include an inorganic material or an organic material. For example, the inorganic material may include a frit seal, and the organic material may include photocurable resin or photoplastic resin. However, a material constituting the bonding member 151 is not limited to the above examples.

The input sensor 201 may be directly arranged on the encapsulation substrate 141. The expression "directly arranged" may mean that a third component is not arranged between the input sensor 201 and the encapsulation substrate 141. That is, a separate adhesive member may not be arranged between the input sensor 201 and the display panel 101. However, embodiments according to the present disclosure are not limited thereto, and an adhesive member may be further arranged between the input sensor 201 and the encapsulation substrate 141.

Figure 4:
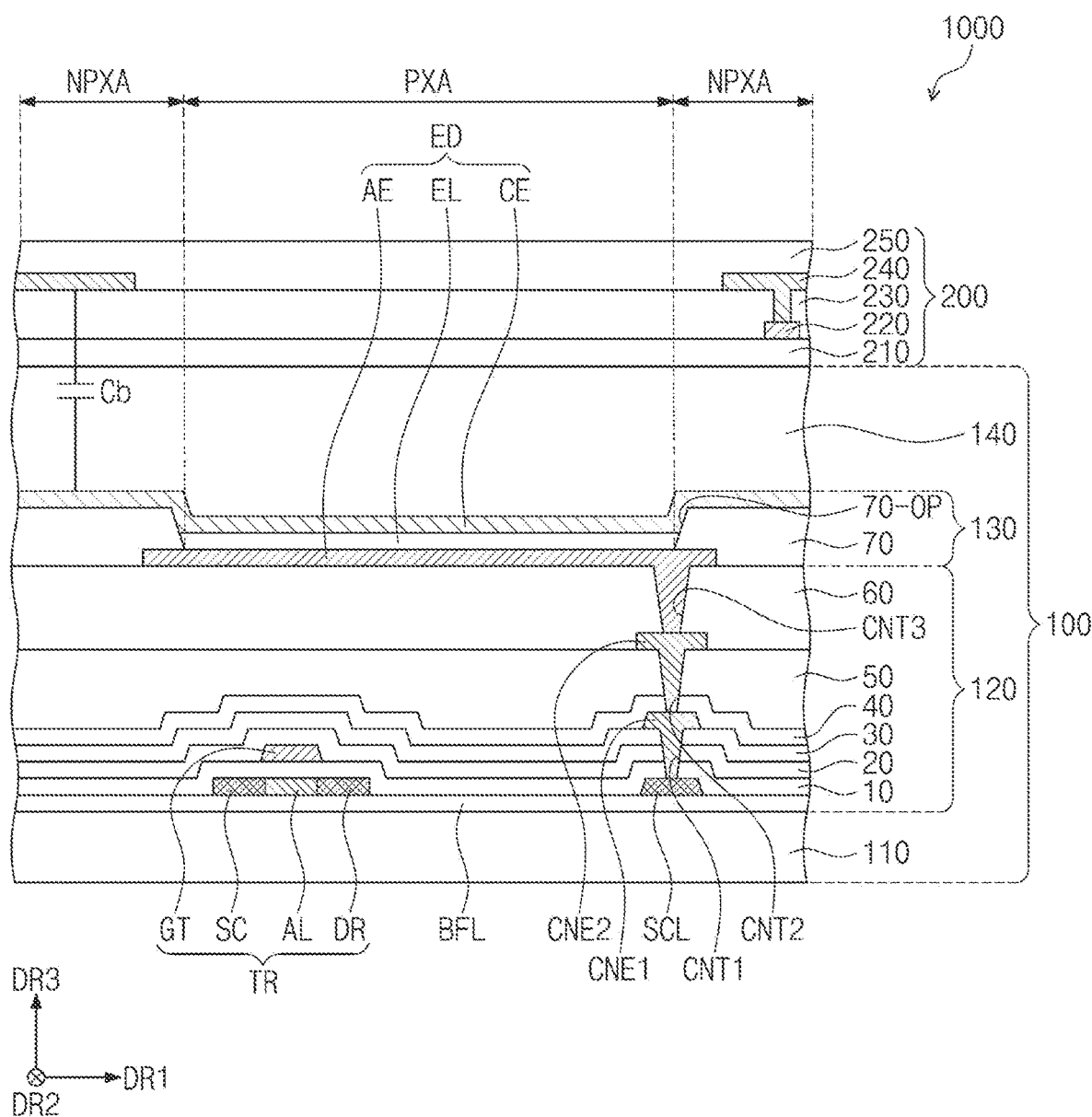
FIG. 4 is a cross-sectional view of a display device according some embodiments.

FIG. 4 is a cross-sectional view of a display device according some embodiments of the inventive concept.

Referring to FIG. 4, at least one inorganic layer is formed on a top surface of the base layer 110. The inorganic layer may include at least one of aluminum oxide, titanium oxide, silicon oxide, silicon nitride, silicon oxynitride, zirconium oxide, or hafnium oxide. The inorganic layer may be formed in multiple inorganic layers. The multiple inorganic layers may constitute a barrier layer and/or a buffer layer. In FIG. 4, the display panel 100 is illustrated to include a buffer layer BFL.

The buffer layer BFL may improve the bonding force between the base layer 110 and the semiconductor pattern. The buffer layer BFL may include at least one of silicon oxide, silicon nitride, or silicon oxynitride. For example, the buffer layer BFL may include a structure in which a silicon oxide layer and a silicon nitride layer are alternately laminated.

The semiconductor pattern may be arranged on the buffer layer BFL. The semiconductor pattern may include polysilicon. However, the semiconductor pattern is not limited thereto and may include amorphous silicon, low-temperature polycrystalline silicon, or an oxide semiconductor. The semiconductor pattern may be provided in plurality.

FIG. 4 illustrates only some of the semiconductor patterns, and some other of the semiconductor patterns may be further arranged in another area. The semiconductor patterns may be arranged in a specific rule across pixels. The semiconductor pattern may have different electrical properties depending on whether the same is doped. The semiconductor pattern may include a first region having a high conductivity and a second region having a low conductivity. The first region may be doped with an N-type dopant or a P-type dopant. A P-type transistor may include a doped region doped with the P-type dopant, and an N-type transistor may include a doped region doped with the N-type dopant. The second region may be a non-doped region or a region doped in a lower concentration than the first region.

The first region may have a higher conductivity than the second region and may substantially serve as an electrode or a signal line. The second region may substantially correspond to an active (or a channel) of a transistor. In other words, a portion of the semiconductor pattern may be the active of the transistor, another portion may be a source or a drain of the transistor, and yet another portion may be a connection electrode or a connection signal line.

Each of the pixels may have an equivalent circuit including seven transistors, one capacitor, and a light emitting element ED, and an equivalent circuit diagram of the pixel may be modified into various forms. In FIG. 4, one transistor TR and the light emitting element ED included in the pixel are illustrated.

A source SC, an active AL, and a drain DR of the transistor TR may be formed from the semiconductor pattern. The source SC and the drain DR may respectively extend in opposite directions from the active AL when viewed on a cross section. FIG. 4 illustrates a portion of a connection signal line SCL formed from the semiconductor pattern. According to some embodiments, the connection signal line SCL may be connected to the drain DR of the transistor TR when viewed in a plane.

A first insulating layer 10 may be arranged on the buffer layer BFL. The first insulating layer 10 may overlap the plurality of pixels in common and cover the semiconductor pattern. The first insulating layer 10 may be an inorganic layer and/or an organic layer and may have a single-layer structure or a multilayer structure. The first insulating layer 10 may include at least one of aluminum oxide, titanium oxide, silicon oxide, silicon nitride, silicon oxynitride, zirconium oxide, or hafnium oxide. According some embodiments, the first insulating layer 10 may be a single-layer silicon oxide layer. In addition to the first insulating layer 10, each of insulating layers included in the circuit layer 120 to be described in more detail later may be an inorganic layer and/or an organic layer and may have a single-layer structure or a multilayer structure. The inorganic layer may include at least one of the above-described materials but embodiments according to the present disclosure are not limited thereto.

A gate GT of the transistor TR is arranged on the first insulating layer 10. The gate GT may be a portion of a metal pattern. The gate GT overlaps the active AL. In a process of doping the semiconductor pattern, the gate GT may function as a mask.

A second insulating layer 20 may be arranged on the first insulating layer 10 and may cover the gate GT. The second insulating layer 20 may overlap the pixels in common. The second insulating layer 20 may be an inorganic layer and/or an organic layer and may have a single-layer structure or a multilayer structure. The second insulating layer 20 may include at least one of silicon oxide, silicon nitride, or silicon oxynitride. According some embodiments, the second insulating layer 20 may have a multilayer structure including a silicon oxide layer and a silicon nitride layer.

A third insulating layer 30 may be arranged on the second insulating layer 20. The third insulating layer 30 may have a single-layer structure or a multilayer structure. For example, the third insulating layer 30 may have a multilayer structure including a silicon oxide layer and a silicon nitride layer.

A first connection electrode CNE1 may be arranged on the third insulating layer 30. The first connection electrode CNE1 may be connected to the connection signal line SCL through a first contact hole CNT1 penetrating the first, second, and third insulating layers 10, 20, and 30.

A fourth insulating layer 40 may be arranged on the third insulating layer 30. The fourth insulating layer 40 may be a single-layer silicon oxide layer. A fifth insulating layer 50 may be arranged on the fourth insulating layer 40. The fifth insulating layer 50 may be an organic layer.

A second connection electrode CNE2 may be arranged on the fifth insulating layer 50. The second connection electrode CNE2 may be connected to the first connection electrode CNE1 through a second contact hole CNT2 penetrating the fourth insulating layer 40 and the fifth insulating layer 50.

A sixth insulating layer 60 may be arranged on the fifth insulating layer 50 and may cover the second connection electrode CNE2. The sixth insulating layer 60 may be an organic layer.

The light emitting element layer 130 may be arranged on the circuit layer 120. The light emitting element layer 130 may include the light emitting element ED. For example, the light emitting element layer 130 may include an organic light emitting material, an inorganic light emitting material, a quantum dot, a quantum rod, a micro LED, or a nano LED. Hereinafter, the light emitting element ED is described as an organic light emitting element but embodiments according to the present disclosure are not particularly limited thereto.

The light emitting element ED may include a first electrode AE, a light emitting layer EL, and a second electrode CE.

The first electrode AE may be arranged on the sixth insulating layer 60. The first electrode AE may be connected to the second connection electrode CNE2 through a third contact hole CNT3 penetrating the sixth insulating layer 60.

A pixel defining film 70 may be arranged on the sixth insulating layer 60 and may cover a portion of the first electrode AE. An opening 70-OP is defined in the pixel defining film 70. The opening 70-OP of the pixel defining film 70 exposes at least a portion of the first electrode AE.

The active area AA (see FIG. 1) may include a light emitting area PXA and a non-light emitting area NPXA adjacent to the light emitting area PXA. The non-light emitting area NPXA may surround the light emitting area PXA. According some embodiments, the light emitting area PXA is defined to correspond to the portion of the first electrode AE exposed by the opening 70-OP.

The light emitting layer EL may be arranged on the first electrode AE. The light emitting layer EL may be arranged in an area corresponding to the opening 70-OP. The light emitting layer EL may be provided in plurality. That is, the light emitting layers EL may be formed separately in the pixels, respectively. When the plurality of light emitting layers EL are respectively formed separately in the pixels, each of the plurality of light emitting layers EL may emit light having at least one of blue, red, or green. However, the light emitting layers EL are not limited thereto and may be connected to each other in an integral shape and provided to the pixels in common. In this case, the light emitting layers EL provided in the integral shape may provide blue light or white light.

The second electrode CE may be arranged on the light emitting layer EL. The second electrode CE may have an integral shape and may be arranged in common in the plurality of pixels.

According to some embodiments, a hole control layer may be arranged between the first electrode AE and the light emitting layer EL. The hole control layer may be arranged in common in the light emitting area PXA and the non-light emitting area NPXA. The hole control layer may include a hole transport layer and may further include a hole injection layer. An electron control layer may be arranged between the light emitting layer EL and the second electrode CE. The electron control layer may include an electron transport layer and may further include an electron injection layer. The hole control layer and the electron control layer may be formed in common in the plurality of pixels by using an open mask.

The encapsulation layer 140 may be arranged on the light emitting element layer 130. The encapsulation layer 140 may include an inorganic layer, an organic layer, and an inorganic layer sequentially laminated, but layers constituting the encapsulation layer 140 are not limited thereto.

The inorganic layers may protect the light emitting element layer 130 from moisture and oxygen, and the organic layer may protect the light emitting element layer 130 from foreign matter such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer but is not limited thereto.

The input sensor 200 may include a base insulating layer 210, a first conductive layer 220, a sensing insulating layer 230, a second conductive layer 240, and a cover insulating layer 250.

The base insulating layer 210 may be an inorganic layer including at least one of silicon nitride, silicon oxynitride, or silicon oxide. Alternatively, the base insulating layer 210 may be an organic layer including epoxy resin, acrylic resin, or imide-based resin. The base insulating layer 210 may have a single-layer structure or may have a multilayer structure laminated in the third direction DR3.

Each of the first conductive layer 220 and the second conductive layer 240 may have a single-layer structure or may have a multilayer structure laminated in the third direction DR3.

The conductive layer of the single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), and indium zinc tin oxide (IZTO). In addition, the transparent conductive layer may include a conductive polymer such as PEDOT, metal nanowires, graphene, and the like.

The conductive layer of the multilayer structure may include metal layers. The metal layers may have, for example, a three-layer structure of titanium/aluminum/titanium. The conductive layer of the multilayer structure may include at least one metal layer and at least one transparent conductive layer.

At least one of the sensing insulating layer 230 or the cover insulating layer 250 may include an inorganic layer. The inorganic layer may include at least one of aluminum oxide, titanium oxide, silicon oxide, silicon nitride, silicon oxynitride, zirconium oxide, or hafnium oxide.

At least one of the sensing insulating layer 230 and the cover insulating layer 250 may include an organic layer. The organic layer may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, or perylene-based resin.

A parasitic capacitance Cb may be generated between the input sensor 200 and the second electrode CE. The parasitic capacitance Cb may also be referred to as a base capacitance. As the distance between the input sensor 200 and the second electrode CE becomes shorter, the parasitic capacitance Cb may increase. As the parasitic capacitance Cb increases, the ratio of an amount of change in capacitance to a reference value may decrease. The amount of change in capacitance may be a value in which a change in capacitance generated by the external input 2000 by an input means (e.g., a user's body) is reflected, or in which a change in capacitance generated by the approach of the object 3000 (see FIG. 2) is reflected.

Figure 5:
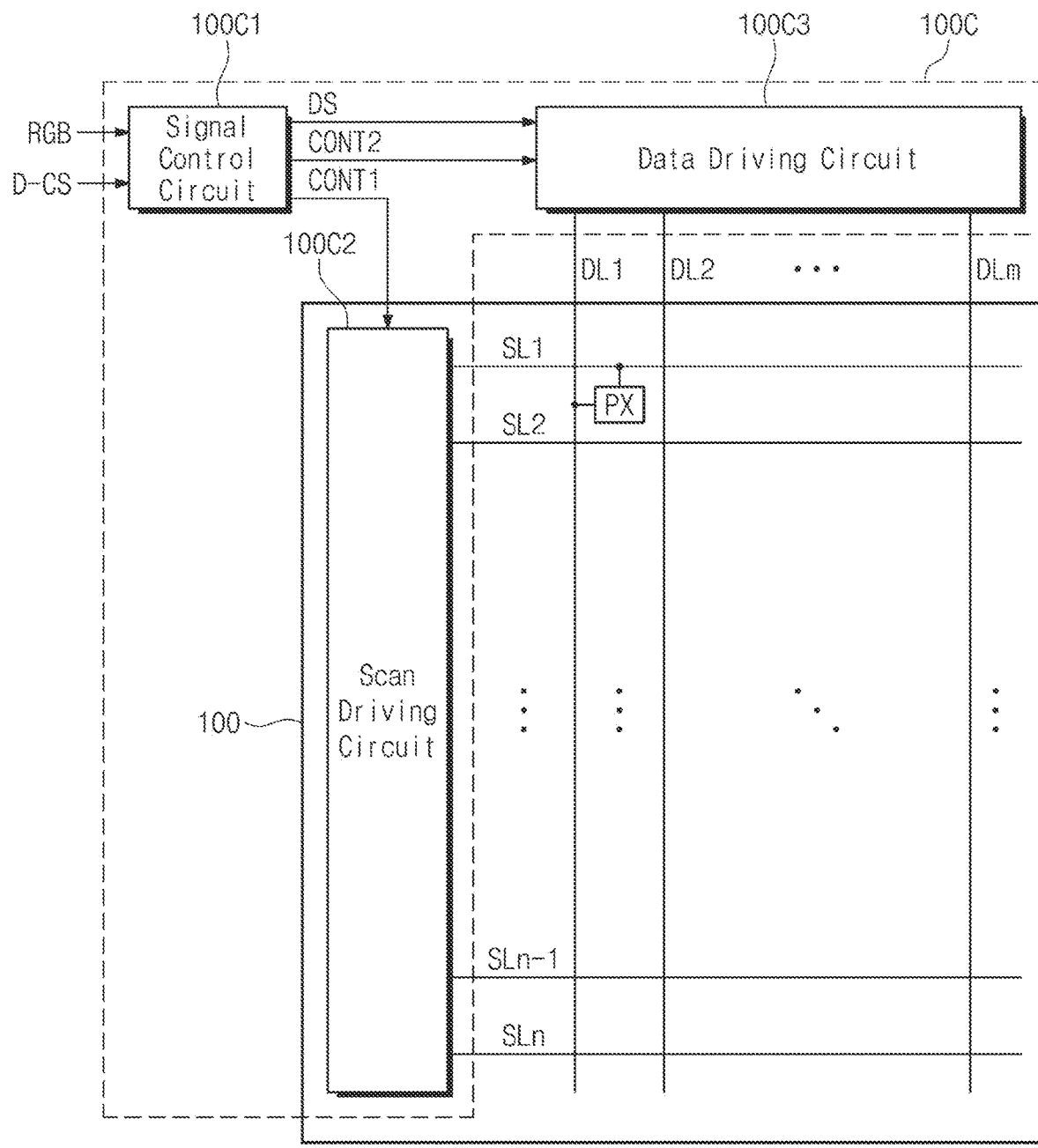
FIG. 5 is a block diagram of a display panel and a panel driver according some embodiments.

FIG. 5 is a block diagram of a display panel and a panel driver according some embodiments of the inventive concept.

Referring to FIG. 5, the display panel 100 may include a plurality of scan lines SL1 to SLn, a plurality of data lines DL1 to DLm, and a plurality of pixels PX. Each of the plurality of pixels PX is connected to a corresponding data line among the plurality of data lines DL1 to DLm and to a corresponding scan line among the plurality of scan lines SL1 to SLn. According some embodiments of the inventive concept, the display panel 100 may further include light emission control lines, and the panel driver 100C may further include a light emission driving circuit that provides control signals to the light emission control lines. The configuration of the display panel 100 is not particularly limited.

The plurality of scan lines SL1 to SLn may each extend in the first direction DR1 and may be arranged to be spaced apart in the second direction DR2. The plurality of data lines DL1 to DLm may each extend in the second direction DR2 and may be arranged to be spaced apart in the first direction DR1.

The panel driver 100C may include a signal control circuit 100C1, a scan driving circuit 100C2, and a data driving circuit 100C3.

The signal control circuit 100C1 may receive the image data RGB and the display control signal D-CS from the main controller 1000C (see FIG. 2). The display control signal D-CS may include various signals. For example, the display control signal D-CS may include the vertical synchronization signal, the horizontal synchronization signal, the main clock, the data enable signal, and the like.

The signal control circuit 100C1 may generate a scan control signal CONT1 on the basis of the display control signal D-CS and output the scan control signal CONT1 to the scan driving circuit 100C2. The scan control signal CONT1 may include a vertical start signal, a clock signal, and the like. The signal control circuit 100C1 may generate a data control signal CONT2 on the basis of the display control signal D-CS and output the data control signal CONT2 to the data driving circuit 100C3. The data control signal CONT2 may include a horizontal start signal, an output enable signal, and the like.

In addition, the signal control circuit 100C1 may output, to the data driving circuit 100C3, a data signal DS obtained by processing the image data RGB according to an operating condition of the display panel 100. The scan control signal CONT1 and the data control signal CONT2 are signals required for operations of the scan driving circuit 100C2 and the data driving circuit 100C3, respectively, and are not particularly limited.

The scan driving circuit 100C2 drives the plurality of scan lines SL1 to SLn in response to the scan control signal CONT1. According some embodiments of the inventive concept, the scan driving circuit 100C2 may be formed through the same process as the circuit layer 120 (see FIG. 4) in the display panel 100, but the scan driving circuit 100C2 is not limited thereto. Optionally, the scan driving circuit 100C2 may be implemented as an integrated circuit (IC) to be directly mounted in an area (e.g., a set or predetermined area) of the display panel 100 or may be mounted on a separate printed circuit board in a chip on film (COF) method to be electrically connected to the display panel 100.

The data driving circuit 100C3 may output gradation voltages to the plurality of data lines DL1 to DLm in response to the data control signal CONT2 and the data signal DS from the signal control circuit 100C1. The data driving circuit 100C3 may be implemented as an integrated circuit to be directly mounted in an area (e.g., a set or predetermined area) of the display panel 100 or may be mounted on a separate circuit board in a chip on film method to be electrically connected to the display panel 100, but the data driving circuit 100C3 is not particularly limited. Optionally, the data driving circuit 100C3 may also be formed through the same process as the circuit layer 120 (see FIG. 4) in the display panel 100.

Figure 6:
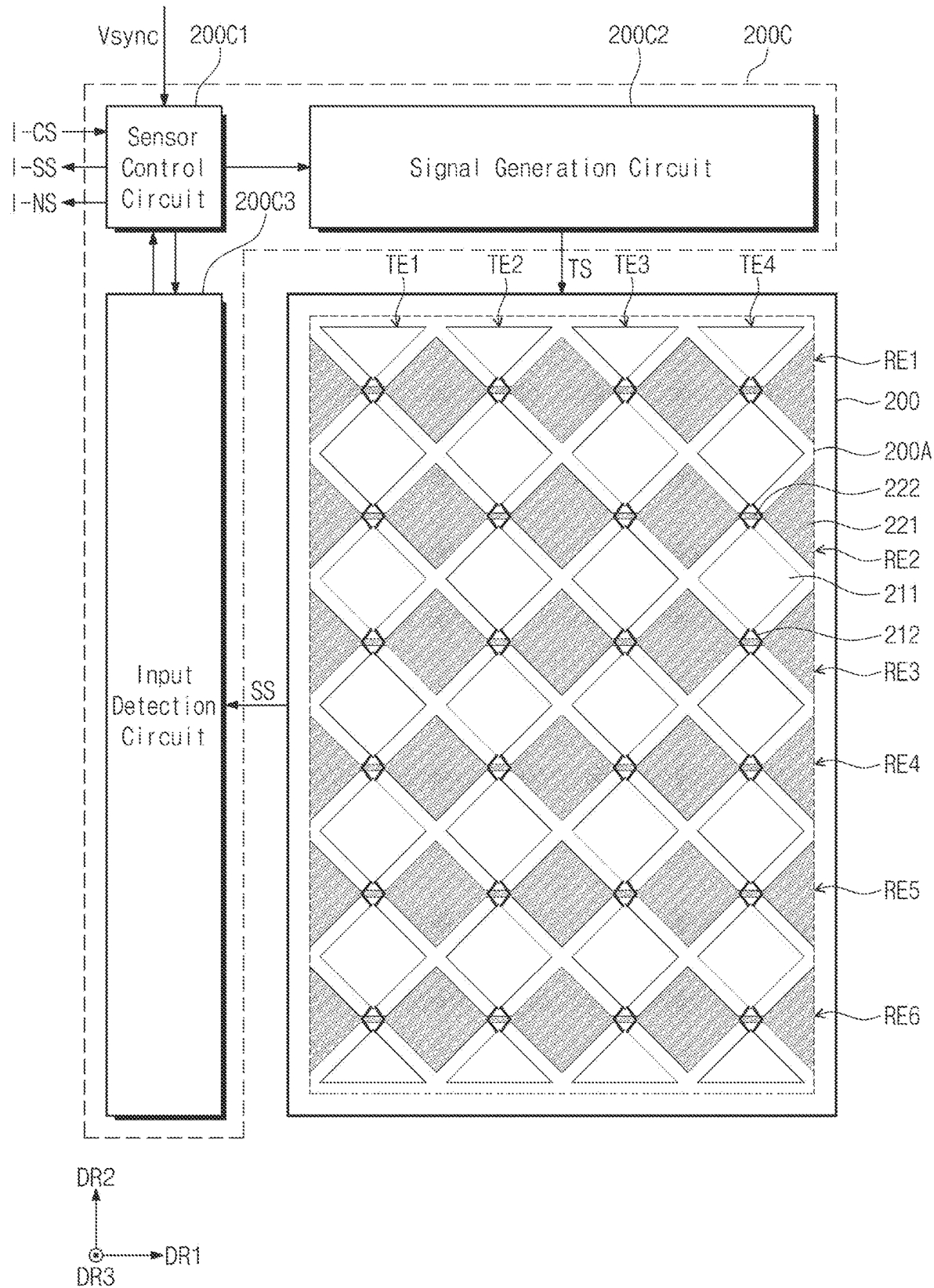
FIG. 6 is a block diagram of an input sensor and a sensor controller according some embodiments.

FIG. 6 is a block diagram of an input sensor and a sensor controller according some embodiments of the inventive concept.

Referring to FIG. 6, the input sensor 200 may include a plurality of transmitting electrodes TE1 to TE4 and a plurality of receiving electrodes RE1 to RE6. The plurality of transmitting electrodes TE1 to TE4 may each extend in the second direction DR2 and may be arranged in the first direction DR1. The plurality of receiving electrodes RE1 to RE6 may each extend in the first direction DR1 and may be arranged in the second direction DR2. The plurality of transmitting electrodes TE1 to TE4 may cross the plurality of receiving electrodes RE1 to RE6. Capacitance may be formed between the plurality of transmitting electrodes TE1 to TE4 and the plurality of receiving electrodes RE1 to RE6.

According to some embodiments, a plurality of first signal lines connected to the plurality of transmitting electrodes TE1 to TE4 and a plurality of second signal lines connected to the plurality of receiving electrodes RE1 to RE6 may be further included in the input sensor 200.

Each of the plurality of transmitting electrodes TE1 to TE4 may include first sensing parts 211 and bridge parts 212. Two first sensing parts 211 adjacent to each other may be electrically connected to each other by a corresponding bridge part 212, but embodiments of the inventive concept are not particularly limited thereto. The first sensing parts 211 and the bridge parts 212 may be arranged on different layers. For example, the first sensing parts 211 may be included in the second conductive layer 240 (see FIG. 4), and the bridge parts 212 may be included in the first conductive layer 220 (see FIG. 4). Optionally, the first sensing parts 211 may be included in the first conductive layer 220, and the bridge parts 212 may be included in the second conductive layer 240.

Each of the plurality of receiving electrodes RE1 to RE6 may include second sensing parts 221 and connection parts 222. The second sensing parts 221 and the connection parts 222 may have an integral shape and may be arranged on the same layer. For example, the second sensing parts 221 and the connection parts 222 may be included in the second conductive layer 240. Optionally, the second sensing parts 221 and the connection parts 222 may be included in the first conductive layer 220.

The bridge parts 212 may respectively cross the connection parts 222 in an insulated manner. When the first and second sensing parts 211 and 221 and the connection parts 222 are included in the second conductive layer 240, the bridge parts 212 may be included in the first conductive layer 220. According to some embodiments, when the first and second sensing parts 211 and 221 and the connection parts 222 are included in the first conductive layer 220, the bridge parts 212 may be included in the second conductive layer 240.

The sensor controller 200C may receive the sensing control signal I-CS from the main controller 1000C (see FIG. 2) and provide the main controller 1000C with the coordinate signal I-SS or the proximity sensing signal I-NS.

The sensor controller 200C may be implemented as an integrated circuit (IC) to be directly mounted in an area (e.g., a set or predetermined area) of the input sensor 200 or may be mounted on a separate printed circuit board in a chip on film (COF) method to be electrically connected to the input sensor 200.

The sensor controller 200C may include a sensor control circuit 200C1, a signal generation circuit 200C2, and an input detection circuit 200C3. The sensor control circuit 200C1 may receive a vertical synchronization signal Vsync from the main controller 1000C. The sensor control circuit 200C1 may control operations of the signal generation circuit 200C2 and the input detection circuit 200C3 on the basis of the sensing control signal I-CS and the vertical synchronization signal Vsync.

The signal generation circuit 200C2 may output transmission signals TS to the input sensor 200, e.g., to the transmitting electrodes TE1 to TE4. The input detection circuit 200C3 may receive sensing signals SS from the receiving electrodes RE1 to RE6 of the input sensor 200. The input detection circuit 200C3 may convert an analog signal into a digital signal. For example, the input detection circuit 200C3 may amplify and then filter the received sensing signals SS, which are analog signals, and may convert the filtered signals into digital signals.

The sensor control circuit 200C1 may generate the coordinate signal I-SS or the proximity sensing signal I-NS on the basis of the digital signals received from the input detection circuit 200C3. Specifically, in a touch sensing mode (or a first sensing mode) in which the external input 2000 (e.g., a touch input; see FIG. 2) by, e.g., a user's finger is sensed, the sensor control circuit 200C1 may generate the coordinate signal I-SS by using the digital signals described above. In addition, in a proximity sensing mode (or a second sensing mode) in which the approach of the object 3000 (see FIG. 2) is sensed, the sensor control circuit 200C1 may generate the proximity sensing signal I-NS by using the above-described digital signals.

Figure 7A:
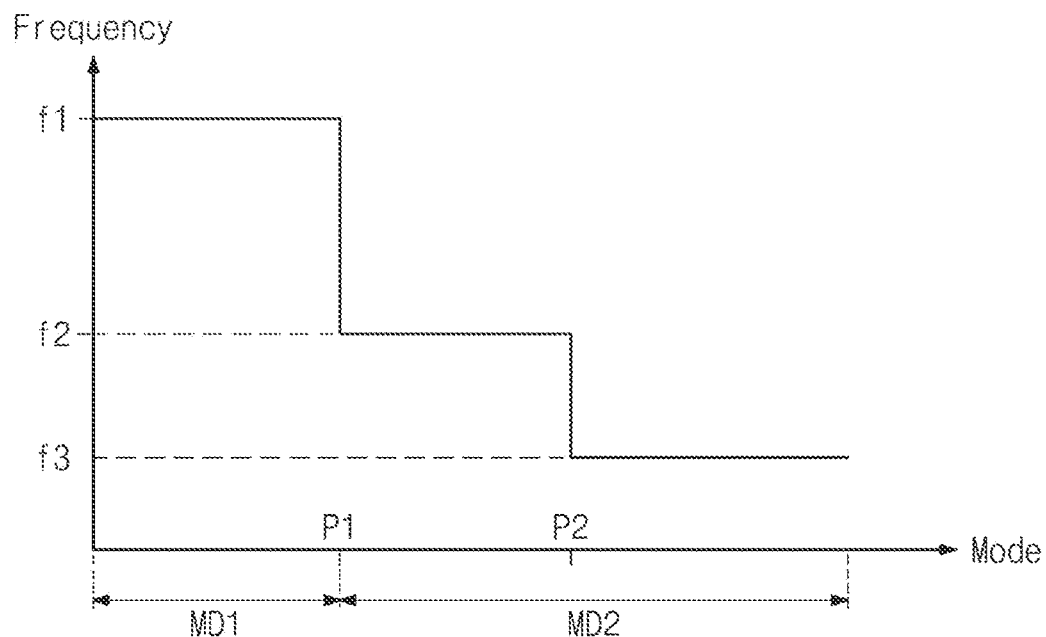
FIG. 7A and FIG. 7B are graphs showing changes in frequency according to a touch sensing mode and a proximity sensing mode according some embodiments.
Figure 7B:
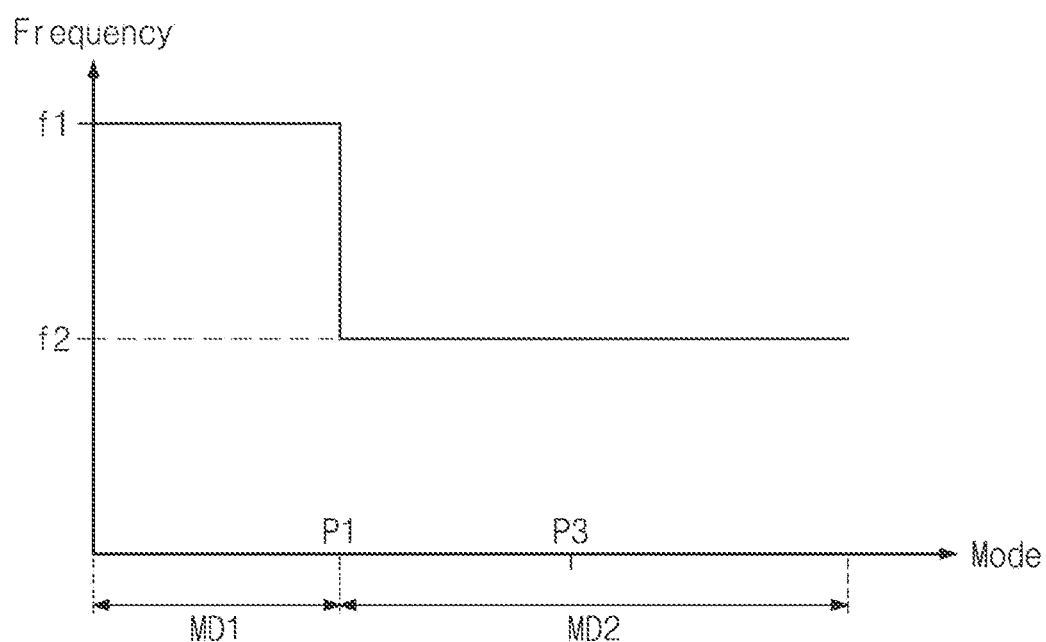

FIG. 7A and FIG. 7B are graphs showing changes in frequency according to a touch sensing mode and a proximity sensing mode according to embodiments of the inventive concept. FIG. 8A is a waveform diagram illustrating first sensing transmission signals transmitted to an input sensor in a touch sensing mode according some embodiments of the inventive concept, and FIG. 8B is a waveform diagram illustrating second sensing transmission signals transmitted to an input sensor in a proximity sensing mode according some embodiments of the inventive concept.

Referring to FIGS. 6, 7A, 7B, 8A, and 8B, the sensor controller 200C may drive, in a touch sensing mode MD1, the input sensor 200 at a first sensing frequency f1. For example, the signal generation circuit 200C2 may generate transmission signals TS having the first sensing frequency f1 and provide the transmission signals TS to the input sensor 200. In the touch sensing mode MD1, the input sensor 200 may receive the above-described transmission signals TS to operate at the first sensing frequency f1.

As illustrated in FIG. 6, when the input sensor 200 includes four transmitting electrodes (hereinafter referred to as first to fourth transmitting electrodes TE1 to TE4), first to fourth transmission signals TS1_1 to TS4_1 may be respectively applied to the first to fourth transmitting electrodes TE1 to TE4. In the touch sensing mode MD1, the first to fourth transmission signals TS1_1 to TS4_1 may be signals having the first sensing frequency f1. According some embodiments of the inventive concept, the first sensing frequency f1 may be about 480 Hz, about 240 Hz, about 120 Hz, or about 60 Hz, but is not particularly limited. In the touch sensing mode MD1, the first to fourth transmission signals TS1_1 to TS4_1 respectively applied to the first to fourth transmitting electrodes TE1 to TE4 may be referred to as first sensing transmission signals.

In the touch sensing mode MD1, each of the first to fourth transmission signals TS1_1 to TS4_1 may be a signal swinging between about 0 V and a first voltage V1. Optionally, each of the first to fourth transmission signals TS1_1 to TS4_1 may be a signal swinging between a first positive voltage +V1 and a first negative voltage −V1.

Each of the first to fourth transmission signals TS1_1 to TS4_1 may include an active period. When a unit of time during which the input sensor 200 senses an input is defined in the touch sensing mode MD1 as one of touch sensing frames IF1_1 to IF1_4, the active periods of the first to fourth transmission signals TS1_1 to TS4_1 may sequentially occur in one of the touch sensing frames IF1_1 to IF1_4. The active periods of the first to fourth transmission signals TS1_1 to TS4_1 may be referred to as first to fourth active periods TP1 to TP4, respectively. Duration of each of the first to fourth active periods TP1 to TP4 may vary depending on the value of the first sensing frequency f1. That is, as the first sensing frequency f1 increases, the duration of each of the first to fourth active periods TP1 to TP4 may decrease.

The sensor controller 200C may switch an operation mode of the input sensor 200 from the touch sensing mode MD1 to a proximity sensing mode MD2.

In the proximity sensing mode MD2, the sensor controller 200C may drive the input sensor 200 at a second sensing frequency f2. For example, the signal generation circuit 200C2 may generate transmission signals TS having the second sensing frequency f2 and provide the transmission signals TS to the input sensor 200. The second sensing frequency f2 may be lower than the first sensing frequency f1. According some embodiments of the inventive concept, the second sensing frequency f2 may be about 60 Hz when the first sensing frequency f1 is any one of about 480 Hz, about 240 Hz, and about 120 Hz, but embodiments according to the present disclosure are not particularly limited. In the proximity sensing mode MD2, the input sensor 200 may receive the above-described transmission signals TS to operate at the second sensing frequency f2. In the proximity sensing mode MD2, each of first to fourth transmission signals TS1_2 to TS4_2 may be a signal having the second sensing frequency f2. In the proximity sensing mode MD2, the first to fourth transmission signals TS1_2 to TS4_2 respectively applied to the first to fourth transmitting electrodes TE1 to TE4 may be referred to as second sensing transmission signals.

In the proximity sensing mode MD2, each of the first to fourth transmission signals TS1_2 to TS4_2 may be a signal swinging between about 0 V and a second voltage V2. According some embodiments of the inventive concept, the second voltage V2 may be higher than the first voltage V1. Optionally, each of the first to fourth transmission signals TS1_2 to TS4_2 may be a signal swinging between a second positive voltage +V2 and a second negative voltage −V2. The second positive voltage +V2 may be higher than the first positive voltage +V1, and the second negative voltage −V2 may be lower than the first negative voltage −V1.

In the proximity sensing mode MD2, a unit of time during which the input sensor 200 senses the approach of the object 3000 (see FIG. 2) may be defined as one of proximity sensing frames IF2_1 and IF2_2. When the second sensing frequency f2 is lower than the first sensing frequency f1, duration of each of the touch sensing frames IF1_1 to IF1_4 may be shorter than duration of each of the proximity sensing frames IF2_1 and IF2_2.

Each of the first to fourth transmission signals TS1_2 to TS4_2 may include an active period. In one of the proximity sensing frames IF2_1 and IF2_2, the active periods of the first to fourth transmission signals TS1_2 to TS4_2 may sequentially occur. The active periods of the first to fourth transmission signals TS1_2 to TS4_2 may be referred to as first to fourth active periods TP1a to TP4a, respectively. Duration of each of the first to fourth active periods TP1a to TP4a may vary depending on the value of the second sensing frequency f2. That is, as the second sensing frequency f2 increases, the duration of each of the first to fourth active periods TP1a to TP4a may decrease.

Because the second sensing frequency f2 is lower than the first sensing frequency f1, the duration of each of the first to fourth active periods TP1a to TP4a may be longer than the duration of each of the first to fourth active periods TP1 to TP4. When the second sensing frequency f2 is about 60 Hz, and the first sensing frequency f1 is about 120 Hz, the duration of each of the first to fourth active periods TP1a to TP4a may be about twice the duration of each of the first to fourth active periods TP1 to TP4.

In the proximity sensing mode MD2, the sensor controller 200C may drive the input sensor 200 under a basic driving condition, a low-frequency driving condition, or a synchronization driving condition. Here, the basic driving condition may be a driving condition of an initial stage or a normal stage when the proximity sensing mode MD2 is entered. Under the basic driving condition, the sensor controller 200C may drive the input sensor 200 at a preset basic frequency, i.e., the second sensing frequency f2. According some embodiments of the inventive concept, when a time point at which the proximity sensing mode MD2 is entered is defined as a first time point P1, the sensor controller 200C may drive the input sensor 200 under the basic driving condition (or a first driving condition) from the first time point P1 to a time point (i.e., a second time point P2 or a third time point P3) at which an additional event occurs at the first sensing frequency f1.

Thereafter, when the additional event occurs, the sensor controller 200C may change the driving condition from the basic driving condition to another driving condition (or a second driving condition, e.g., the low-frequency driving condition or the synchronization driving condition).

Hereinafter, the low-frequency driving condition and the synchronization driving condition will be described in detail with reference to FIGS. 9, 10A, and 10B.

Figure 9:
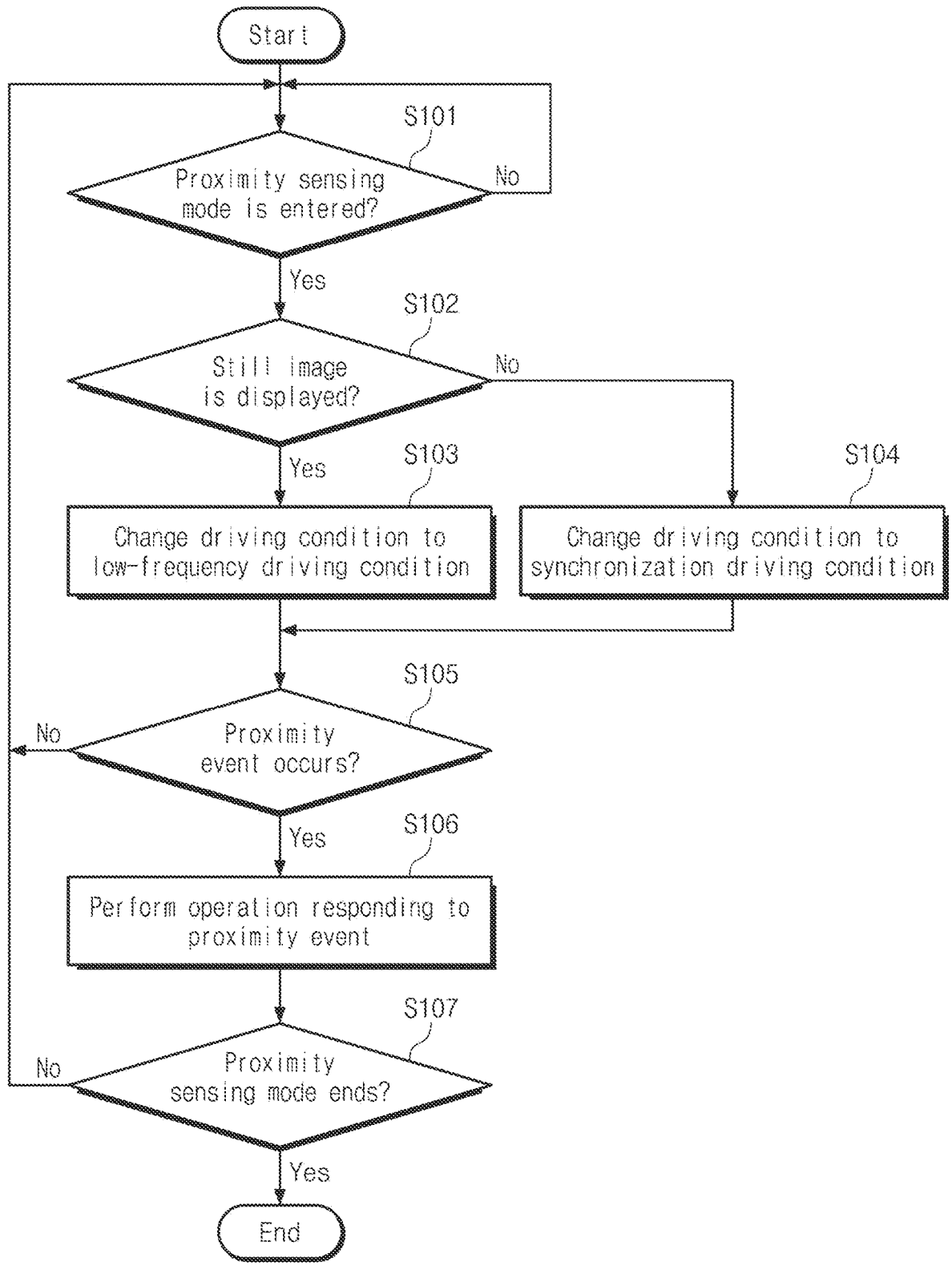
FIG. 9 is a flowchart for describing an operation in a proximity sensing mode according some embodiments.

FIG. 9 is a flowchart for describing an operation in a proximity sensing mode according some embodiments of the inventive concept. FIG. 10A is a waveform diagram illustrating third sensing transmission signals transmitted to an input sensor under a low-frequency driving condition of a proximity sensing mode according some embodiments of the inventive concept. FIG. 10B is a conceptual diagram illustrating synchronization driving condition of a proximity sensing mode according some embodiments of the inventive concept, and FIG. 10C is a waveform diagram illustrating fourth sensing transmission signals transmitted to an input sensor under a synchronization driving condition of a proximity sensing mode according some embodiments of the inventive concept.

Referring to FIG. 2 and FIG. 9, the sensor controller 200C determines whether to operate in the proximity sensing mode MD2 (see FIG. 7A) or operate in the touch sensing mode MD1 (see FIG. 7A) (S101). When the proximity sensing mode MD2 is entered, the sensor controller 200C may determine whether an image displayed on the display panel 100 is a still image (S102).

The sensor controller 200C may receive from the main controller 1000C a determination signal by which it may be determined whether the image displayed on the display panel 100 is a still image. To drive the display panel 100 in a low-frequency mode (or a first display mode) or a high-frequency mode (or a second display mode) according to which image (e.g., a still image or a moving image) is displayed on the display panel 100, the main controller 1000C may determine whether the image displayed on the display panel 100 is a still image or a moving image. The display panel 100 may operate at a first driving frequency in the low-frequency mode and operate at a second driving frequency higher than the first driving frequency in the high-frequency mode. For example, the first driving frequency may be a frequency lower than about 60 Hz, and the second driving frequency may be a frequency of about 120 Hz or higher.

The sensor controller 200C may receive from the main controller 1000C the determination signal generated according to a result of the determination described above and may use the determination signal in the proximity sensing mode MD2. When a result of the determination indicates that a still image is displayed on the display panel 100, the sensor controller 200C may change a driving condition from a basic driving condition to the low-frequency driving condition. According some embodiments of the inventive concept, the input sensor 200 may operate, under the low-frequency driving condition, at a third sensing frequency f3 lower than a second sensing frequency f2. For example, when the second sensing frequency f2 is about 60 Hz, the third sensing frequency f3 may be about 20 Hz or about 30 Hz.

Figure 10A:
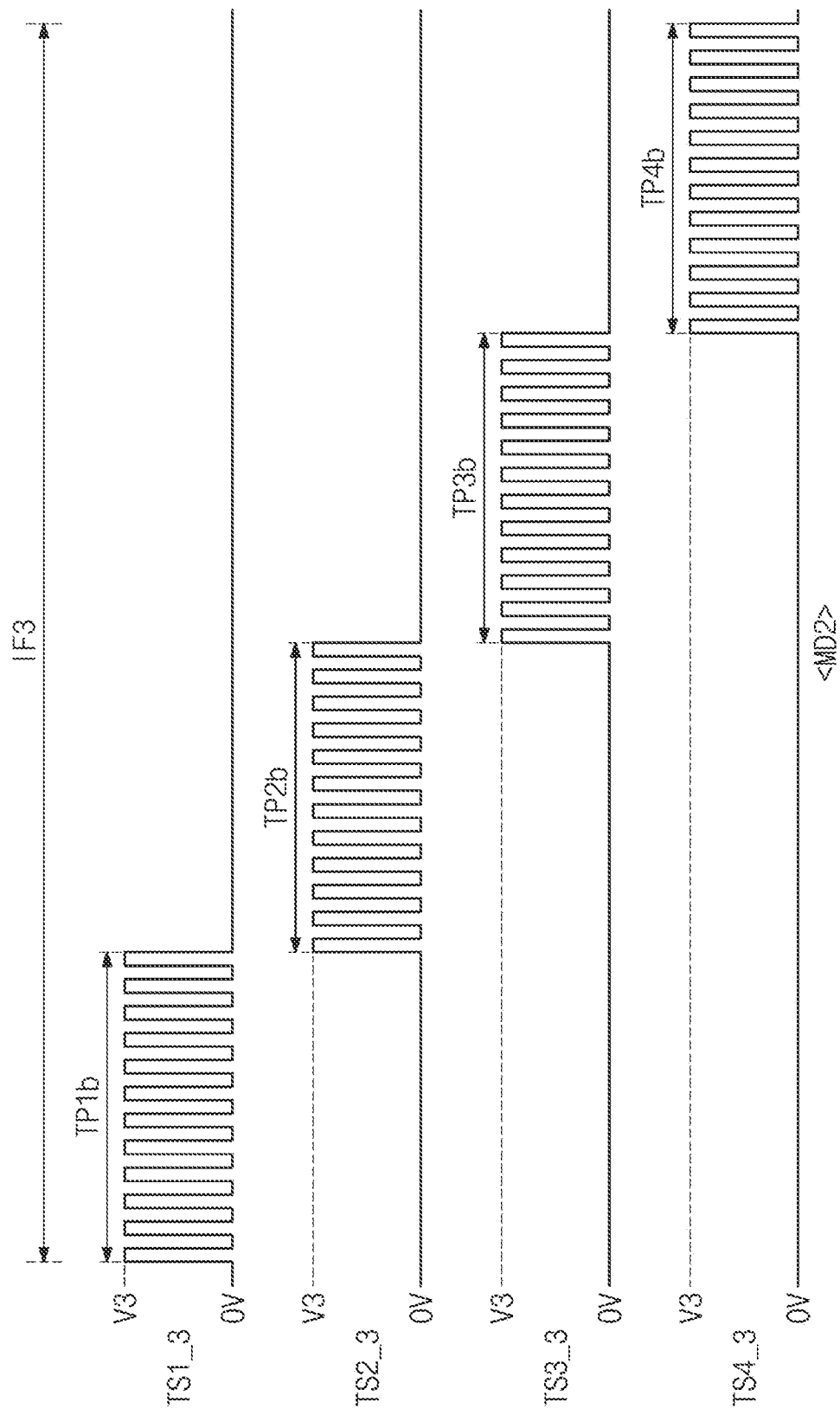
FIG. 10A is a waveform diagram illustrating third sensing transmission signals transmitted to an input sensor under a low-frequency driving condition of a proximity sensing mode according some embodiments.

Referring to FIG. 2 and FIG. 10A, a unit of time during which the input sensor 200 senses the approach of the object 3000 under the low-frequency driving condition may be defined as one of low-frequency sensing frames IF3. When the third sensing frequency f3 is lower than the second sensing frequency f2, duration of each of the low-frequency sensing frames IF3 may be longer than duration of each of proximity sensing frames IF2_1 and IF2_2 (see FIG. 8B). In the low-frequency driving condition of the proximity sensing mode MD2, the first to fourth transmission signals TS1_3 to TS4_3 respectively applied to the first to fourth transmitting electrodes TE1 to TE4 (see FIG. 6) may be referred to as third sensing transmission signals.

Under the low-frequency driving condition, each of first to fourth transmission signals TS1_3 to TS4_3 may be a signal swinging between about 0 V and a third voltage V3. According some embodiments of the inventive concept, the third voltage V3 may be higher than or equal to a second voltage V2. Optionally, each of the first to fourth transmission signals TS1_3 to TS4_3 may be a signal swinging between a third positive voltage +V3 and a third negative voltage −V3. The third positive voltage +V3 may be higher than or equal to a second positive voltage +V2, and the third negative voltage −V3 may be lower than or equal to a second negative voltage −V2.

Each of the first to fourth transmission signals TS1_3 to TS4_3 may include an active period. In one of the low-frequency sensing frames IF3, the active periods of the first to fourth transmission signals TS1_3 to TS4_3 may sequentially occur. The active periods of the first to fourth transmission signals TS1_3 to TS4_3 may be referred to as first to fourth active periods TP1b to TP4b, respectively. Duration of each of the first to fourth active periods TP1b to TP4b may vary depending on the value of the third sensing frequency f3. That is, as the third sensing frequency f3 decreases, the duration of each of the first to fourth active periods TP1b to TP4b may increase.

Because the third sensing frequency f3 is lower than the second sensing frequency f2, the duration of each of the first to fourth active periods TP1b to TP4b may be longer than duration of each of first to fourth active periods TP1a to TP4a (see FIG. 8B). When the second sensing frequency f2 is about 60 Hz, and the third sensing frequency f3 is about 30 Hz, the duration of each of the first to fourth active periods TP1b to TP4b may be about twice the duration of each of the first to fourth active periods TP1a to TP4a.

When the frequency of each of the transmission signals TS1_3 to TS4_3 is reduced to the third sensing frequency f3 as described above, and a voltage level of each of the transmission signals TS1_3 to TS4_3 is increased, a distance at which the input sensor 200 is capable of proximity sensing may increase. In addition, there is generated an increased amount of change in capacitance when the object 3000 comes close, so that the time required to sense the approach of the object 3000 may be shortened. Overall, proximity sensing performance may be improved under the low-frequency driving condition.

Referring back to FIG. 9, when the result of the determination in step S102 indicates that a still image is not displayed on the display panel 100, the sensor controller 200C may change the driving condition from the basic driving condition to the synchronization driving condition. According some embodiments of the inventive concept, the input sensor 200 may operate at the second sensing frequency f2 under the synchronization driving condition as under the basic driving condition. For example, the second sensing frequency f2 may be about 60 Hz.

Referring to FIGS. 2, 10B, and 10C, units of time during which the display panel 100 displays an image may be referred to as display frames DF1 to DFk+1. When a driving frequency of the display panel 100 is about 60 Hz, time corresponding to each of the display frames DF1 to DFk+1 may be about 16.67 ms. The driving frequency (i.e., a display frequency) of the display panel 100 may be determined by a vertical synchronization signal Vsync.

When the input sensor 200 operates at the first sensing frequency f1 (see FIG. 7A) in the touch sensing mode MD1, the first sensing frequency f1 may not be synchronized with the display frequency.

When the input sensor 200 operates at the second sensing frequency f2 (see FIG. 7A) under the synchronization driving condition of the proximity sensing mode MD2, the second sensing frequency f2 may be synchronized with the display frequency. That is, the sensor controller 200C may receive the vertical synchronization signal Vsync from the main controller 1000C, and from the third time point P3 (see FIG. 7B) at which the synchronization driving condition starts to be applied, may synchronize the input sensor 200 with the vertical synchronization signal Vsync to drive the input sensor 200. In the synchronization driving condition of the proximity sensing mode MD2, the first to fourth transmission signals TS1_4 to TS4_4 respectively applied to the first to fourth transmitting electrodes TE1 to TE4 (see FIG. 6) may be referred to as fourth sensing transmission signals.

Under the synchronization driving condition of the proximity sensing mode MD2, each of first to fourth transmission signals TS1_4 to TS4_4 may be a signal having the second sensing frequency f2.

Under the synchronization driving condition of the proximity sensing mode MD2, a unit of time during which the input sensor 200 senses the approach of the object 3000 may be defined as one of synchronization sensing frames IF4_1 and IF4_2. Each of the first to fourth transmission signals TS1_4 to TS4_4 may include an active period. In one of the synchronization sensing frames IF4_1 and IF4_2, the active periods of the first to fourth transmission signals TS1_4 to TS4_4 may sequentially occur. The active periods of the first to fourth transmission signals TS1_4 to TS4_4 may be referred to as first to fourth active periods TP1c to TP4c, respectively. In one of the synchronization sensing frames IF4_1 and IF4_2, a start time point of the first active period TP1c may substantially coincide with a start time point of a corresponding one of the display frames DFk and DFk+1. That is, a start time point of each of the synchronization sensing frames IF4_1 and IF4_2 may substantially coincide with a start time point of a corresponding one of the display frames DFk and DFk+1.

A proximity sensing signal I-NS detected in the proximity sensing mode MD2 may include more noise when a moving image is displayed on the display panel 100 than when a still image is displayed on the display panel 100. However, when the synchronization sensing frames IF4_1 and IF4_2 are synchronized with the display frames DFk and DFk+1, noise components included in sensing signals SS received from the input sensor 200 may have a certain pattern. Accordingly, the sensor controller 200C may easily extract and filter out the noise components from the sensing signals SS (see FIG. 6) and may generate the proximity sensing signal I-NS by using signals obtained by removing the noise components from the sensing signals SS, thereby improving proximity sensing sensitivity.

Referring back to FIG. 2 and FIG. 9, the main controller 1000C receives the proximity sensing signal I-NS from the sensor controller 200C and determines, on the basis of the proximity sensing signal I-NS, whether a proximity event has occurred (S105). When a result of the determination indicates that the proximity event has occurred, an operation responding to the proximity event, e.g., an operation such as turning off a display screen may be performed (S106). However, when the proximity event has not occurred, the operation of the proximity sensing mode may restart by moving to step S101.

Thereafter, it is determined whether to end the proximity sensing mode (S107), and an end procedure may be performed when a result of the determination is ending the mode, and the operation of the proximity sensing mode may be performed again by moving to step S101 when the result of the determination is not ending the mode.

Figure 11:
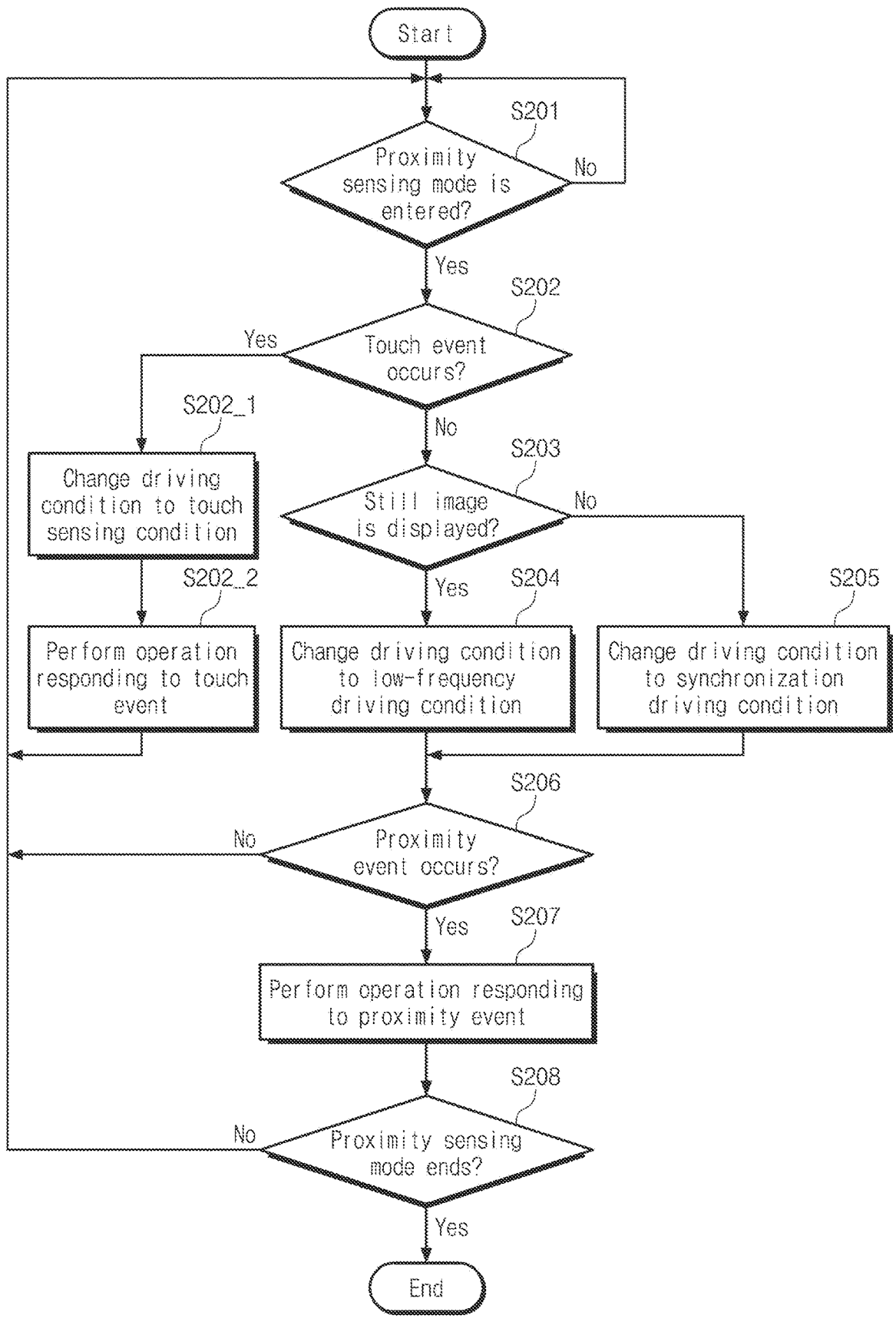
FIG. 11 is a flowchart for describing an operation in a proximity sensing mode according some embodiments.
Figure 12A:
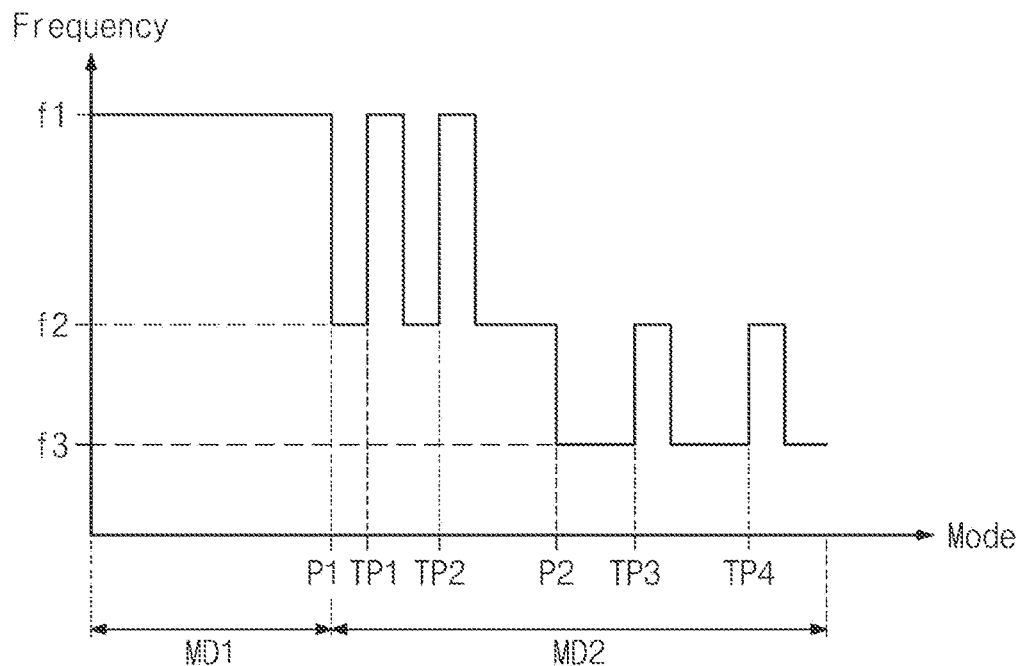
FIG. 12A and FIG. 12B are graphs showing changes in frequency in a proximity sensing mode according some embodiments.
Figure 12B:
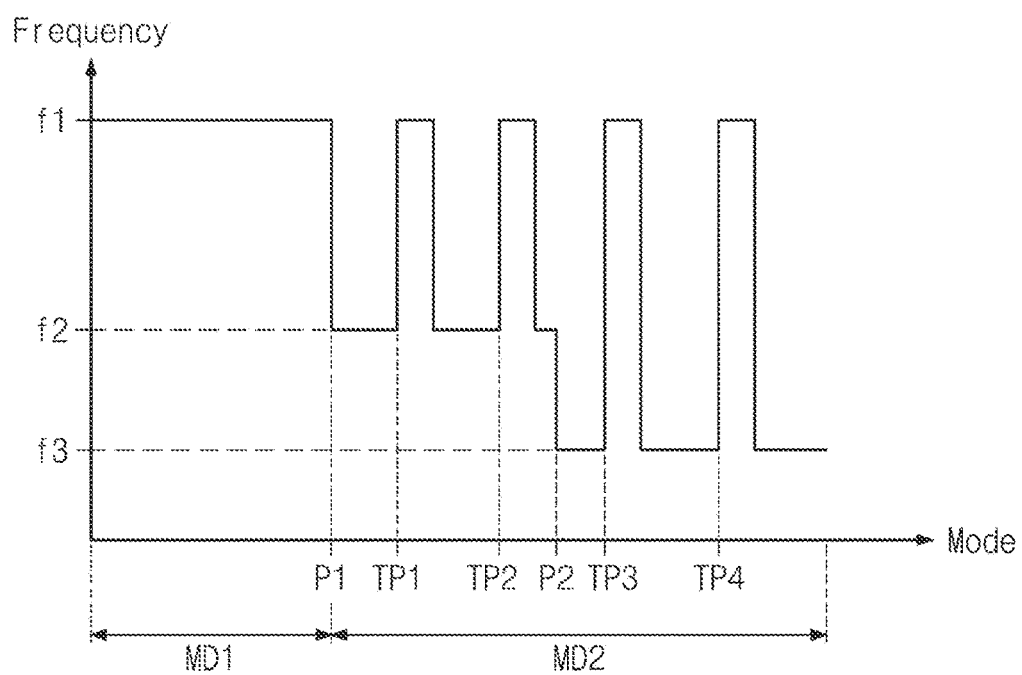

FIG. 11 is a flowchart for describing an operation in a proximity second sensing mode according some embodiments of the inventive concept, and FIG. 12A and FIG. 12B are graphs showing changes in frequency in a proximity second sensing mode according to embodiments of the inventive concept.

Referring to FIG. 2 and FIG. 11, the sensor controller 200C determines whether to operate in the proximity sensing mode MD2 (see FIG. 12a) or operate in the touch sensing mode MD1 (see FIG. 12a) (S201). When the proximity sensing mode is entered, the sensor controller 200C may determine whether a touch event has occurred (S202).

When a result of the determination of step S202 indicates that the touch event has not occurred, the sensor controller 200C may determine whether an image displayed on the display panel 100 is a still image (S203).

The sensor controller 200C may receive from the main controller 1000C a determination signal by which it may be determined whether the image displayed on the display panel 100 is a still image. That is, the determination signal received from the main controller 1000C may be utilized in the proximity sensing mode MD2.

When a result of the determination indicates that a still image is displayed on the display panel 100, the sensor controller 200C may change a driving condition from a basic driving condition to the low-frequency driving condition (S204). According some embodiments of the inventive concept, under the low-frequency driving condition, the input sensor 200 may operate at the third sensing frequency f3 lower than the second sensing frequency f2. For example, when the second sensing frequency f2 is about 60 Hz, the third sensing frequency f3 may be about 20 Hz or about 30 Hz.

When the result of the determination indicates that a still image is not displayed on the display panel 100, the sensor controller 200C may change the driving condition from the basic driving condition to a synchronization driving condition (S205). According some embodiments of the inventive concept, the input sensor 200 may operate at the second sensing frequency f2 under the synchronization driving condition as under the basic driving condition. For example, the second sensing frequency f2 may be about 60 Hz.

Because the low-frequency driving condition and the synchronization driving condition have been described in detail with reference to FIG. 9 to FIG. 10C, a detailed description of the low-frequency driving condition and the synchronization driving condition will not be given here.

The sensor controller 200C generates a proximity sensing signal I-NS on the basis of sensing signals SS (see FIG. 6) received from the input sensor 200, and the main controller 1000C determines, on the basis of the proximity sensing signal I-NS, whether a proximity event has occurred (S206). When a result of the determination indicates that the proximity event has occurred, an operation responding to the proximity event, e.g., an operation such as turning off a display screen may be performed (S207). However, when the proximity event has not occurred, the operation of the proximity sensing mode MD2 may restart by moving to step S201.

Thereafter, it is determined whether to end the proximity sensing mode MD2 (S208), and an end procedure may be performed when a result of the determination is ending the mode, and the operation of the proximity sensing mode MD2 may be performed again by moving to step S201 when the result of the determination is not ending the mode.

When a result of the determination in step S202 indicates that the touch event has occurred, the sensor controller 200C may change the driving condition from the basic driving condition to a touch sensing condition (S202_1). According some embodiments of the inventive concept, the input sensor 200 may operate at a first sensing frequency f1 under the touch sensing condition. For example, the first sensing frequency f1 may be about 120 Hz, about 240 Hz, or about 480 Hz. That is, there may occur an event of inputting numbers, etc. through a keypad while the input sensor 200 operates in the proximity sensing mode MD2, and in this case, the sensor controller 200C may drive the input sensor 200 under the touch sensing condition to improve touch sensitivity. Here, the touch sensing condition may be the same as the driving condition of the touch sensing mode MD1. That is, under the touch sensing condition, the sensor controller 200C may transmit the transmission signals TS1_1 to TS4_1 illustrated in FIG. 8A to the input sensor 200.

Thereafter, an operation responding to the touch is performed (S202_2), and after the operation is completed, the operation of the proximity sensing mode may restart by moving to step S201.

Referring to FIGS. 2, 12A, and 12B, in the touch sensing mode MD1, the sensor controller 200C may drive the input sensor 200 at the first sensing frequency f1. After switching to the proximity sensing mode MD2 at a first time point P1, the sensor controller 200C may drive the input sensor 200 under the basic driving condition (e.g., at the second sensing frequency f2).

Thereafter, when touch events occur at first and second touch time points TP1 and TP2, the sensor controller 200C may drive the input sensor 200 under the touch sensing condition (e.g., at the first sensing frequency f1).

Subsequently, when the driving condition changes from the basic driving condition to the low-frequency driving condition at a second time point P2, the sensor controller 200C may drive the input sensor 200 under the low-frequency driving condition. Even in the process of driving the input sensor 200 under the low-frequency driving condition, the sensor controller 200C may detect whether a touch event has occurred. When touch events occur at third and fourth touch time points TP3 and TP4, the sensor controller 200C may drive the input sensor 200 under the touch sensing condition (e.g., at the first sensing frequency f1 or the second sensing frequency f2).

Accordingly, touch sensing performance may be improved in sensing the touch event occurring while the input sensor 200 operates in the proximity sensing mode MD2.

According some embodiments of the inventive concept, when the input sensor operates in the first sensing mode or the second sensing mode, the input sensor may be driven under a driving condition different from that of the first sensing mode when the second sensing mode is entered. In addition, even after the sensing mode switches from the first sensing mode to the second sensing mode, the sensing performance in the second sensing mode may be improved by changing the driving condition of the second sensing mode according to a specific event.

Although aspects of some embodiments of the inventive concept have been described herein, it is understood that various changes and modifications can be made by those skilled in the art within the spirit and scope of embodiments according to the inventive concept defined by the following claims or their equivalents. Therefore, the example embodiments described herein are not intended to limit the technical spirit and scope of embodiments according to the present invention, and all technical spirit within the scope of the following claims or the equivalents will be construed as being included in the scope of embodiments according to the present invention.

What is claimed is:

1. A display device comprising:
a display panel configured to display an image;
an input sensor on the display panel and configured to operate in a first sensing mode or a second sensing mode different from the first sensing mode; and
a sensor controller configured to drive the input sensor,
wherein the sensor controller is configured to drive the input sensor under a first driving condition different from a driving condition of the first sensing mode in response to the second sensing mode being entered, and
the sensor controller is configured to change the first driving condition to a second driving condition different from the first driving condition according to a specific event which occurs after entering the second sensing mode,
the input sensor is configured to operate at a first sensing frequency in the first sensing mode, and
the input sensor is configured to operate at a second sensing frequency lower than the first sensing frequency under the first driving condition of the second sensing mode,
the display panel is configured to operate in a first display mode or a second display mode different from the first display mode,
wherein the display panel is configured to operate at a first driving frequency in the first display mode, and
the display panel is configured to operate at a second driving frequency higher than the first driving frequency in the second display mode,
the sensor controller is configured to determine, after the second sensing mode is entered, whether or not the display panel operates in the first display mode or operates in the second display mode.

2. The display device of claim 1, wherein the sensor controller is configured to:
provide, in the first sensing mode, the input sensor with a first sensing transmission signal having a first voltage level; and
provide, in the second sensing mode, the input sensor with a second sensing transmission signal having a second voltage level different from the first voltage level.

3. The display device of claim 2, wherein the second driving condition comprises a low-frequency driving condition under which the input sensor is driven at a third sensing frequency lower than the second sensing frequency and a synchronization driving condition under which the input sensor is driven in synchronization with the display panel.

4. The display device of claim 3, wherein the sensor controller is configured to:

change the driving condition from the first driving condition to the low-frequency driving condition in response to the display panel operating in the first display mode; and change the driving condition from the first driving condition to the synchronization driving condition in response to the display panel operating in the second display mode.

5. The display device of claim 4, wherein the sensor controller is configured to provide, under the low-frequency driving condition, the input sensor with a third sensing transmission signal having a third voltage level higher than or equal to the second voltage level.

6. The display device of claim 4, wherein the input sensor is configured to operate at the second sensing frequency under the synchronization driving condition.

7. The display device of claim 2, wherein the sensor controller is configured to determine, after the second sensing mode is entered, whether or not a touch event has occurred.

8. The display device of claim 7, wherein the second driving condition comprises a low-frequency driving condition under which the input sensor is driven at a third sensing frequency lower than the second sensing frequency, a synchronization driving condition under which the input sensor is driven in synchronization with the display panel, and a touch sensing condition under which the input sensor is driven at a sensing frequency higher than the second or third sensing frequency.

9. The display device of claim 8, wherein
the sensor controller is configured to change the driving condition from the first driving condition to the touch sensing condition in response to the touch event occurring, and
the sensor controller is configured to maintain the first driving condition, the low-frequency driving condition, or the synchronization driving condition in response to the touch event not occurring.

10. The display device of claim 1, further comprising:
a panel driver configured to drive the display panel; and
a main controller configured to provide a vertical synchronization signal to the panel driver.

11. The display device of claim 10, wherein the sensor controller is configured to receive the vertical synchronization signal from the main controller, to synchronize the input sensor with the display panel according to the vertical synchronization signal in the second sensing mode, and to drive the input sensor.

12. A method of driving a display device, the method comprising:
displaying an image through a display panel;
driving an input sensor on the display panel in a first sensing mode or a second sensing mode different from the first sensing mode,
operating the display panel in a first display mode or a second display mode different from the first display mode; and
comprising determining, after the second sensing mode is entered, whether the display panel operates in the first display mode or operates in the second display mode,
wherein the driving of the input sensor comprises:

driving the input sensor under a first driving condition different from a driving condition of the first sensing mode in response to the second sensing mode being entered; and
changing first driving condition to a second driving condition according to a specific event which occurs after entering the second sensing mode,
the input sensor is configured to operate at a first sensing frequency in the first sensing mode, and
the input sensor is configured to operate at a second sensing frequency lower than the first sensing frequency under the first driving condition of the second sensing mode,
wherein the display panel operates at a first driving frequency in the first display mode, and
the display panel operates at a second driving frequency higher than the first driving frequency in the second display mode.

13. The method of driving a display device of claim 12,
wherein the second driving condition comprises a low-frequency driving condition under which the input sensor is driven at a third sensing frequency lower than the second sensing frequency and a synchronization driving condition under which the input sensor is driven in synchronization with the display panel.

14. The method of driving a display device of claim 13, further comprising:
changing the driving condition from the first driving condition to the low-frequency driving condition in response to the display panel operating in the first display mode; and
changing the driving condition from the first driving condition to the synchronization driving condition in response to the display panel operating in the second display mode.

15. A display device comprising:
a display panel configured to display an image;
an input sensor on the display panel and configured to operate in a first sensing mode or a second sensing mode different from the first sensing mode; and
a sensor controller configured to drive the input sensor,
wherein the sensor controller is configured to drive the input sensor under a first driving condition different from a driving condition of the first sensing mode in response to the second sensing mode being entered, and
the sensor controller is configured to change the first driving condition to a second driving condition different from the first driving condition according to a specific event which occurs after entering the second sensing mode,
the display panel is configured to operate in a first display mode or a second display mode different from the first display mode,
wherein the display panel is configured to operate at a first driving frequency in the first display mode, and
the display panel is configured to operate at a second driving frequency higher than the first driving frequency in the second display mode,
the sensor controller is configured to determine, after the second sensing mode is entered, whether or not the display panel operates in the first display mode or operates in the second display mode.

* * * * *